US007903767B2

(12) United States Patent
Maeda et al.

(10) Patent No.: US 7,903,767 B2
(45) Date of Patent: Mar. 8, 2011

(54) SIGNAL RECEPTION TIME PERIOD DETECTOR

(75) Inventors: Koji Maeda, Yokosuka (JP); Anass Benjebbour, Yokosuka (JP); Takahiro Asai, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 956 days.

(21) Appl. No.: 11/754,079

(22) Filed: May 25, 2007

(65) Prior Publication Data

US 2007/0281649 A1 Dec. 6, 2007

(30) Foreign Application Priority Data

May 30, 2006 (JP) ................................ 2006-150463

(51) Int. Cl.
*H04L 27/06* (2006.01)
*H04B 1/10* (2006.01)
(52) U.S. Cl. ........................................ 375/342; 375/346
(58) Field of Classification Search .................. 375/260, 375/340, 342, 346, 347, 348
See application file for complete search history.

(56) References Cited

U.S. PATENT DOCUMENTS

| 5,995,565 | A * | 11/1999 | Tong et al. ..................... 375/346 |
| 6,711,528 | B2 * | 3/2004 | Dishman et al. .............. 702/189 |
| 6,912,262 | B1 | 6/2005 | Chini et al. |
| 7,327,812 | B2 * | 2/2008 | Auer ............................. 375/347 |
| 2002/0150070 | A1 * | 10/2002 | Shattil ........................... 370/342 |
| 2002/0159413 | A1 | 10/2002 | Tsubouchi et al. |
| 2004/0247044 | A1 * | 12/2004 | Matsushita et al. ........... 375/316 |
| 2005/0002369 | A1 | 1/2005 | Ro et al. |
| 2005/0265431 | A1 | 12/2005 | Pietila et al. |

FOREIGN PATENT DOCUMENTS

| EP | 1 389 846 A2 | 2/2004 |
| JP | 2005-84244 A | 3/2005 |
| WO | WO 95/12262 | 5/1995 |

OTHER PUBLICATIONS

J.L. Lacoume, et al., "Sources Indentification: A Solution Based on the Cumulants", Proceedings of 4$^{th}$ Annual ASSP Workshop, Aug. 3, 1988, pp. 199-203.
P. W. Wolniansky, et al., "V-BLAST: An Architecture for Realizing Very High Data Rates Over the Rich-Scattering Wireless Channel", IEEE, Proceedings of ISSSE 98, Sep. 1998, pp. 295-300.
Hitoshi Yoshino, et al., "Interference Canceling Equalizer (ICE) for Mobile Radio Communication", IEEE Transactions on Vehicular Technology, vol. 46, No. 4, Nov. 1997, pp. 849-861.
Babak Hassibi, "An Efficient Square-Root Algorithm for Blast", IEEE, International Conference on Acoustics, Speech, and Signal Proceedings (ICASSP), Jul. 2000, pp. 737-740.
Edited by Keiji Tachikawa, "Latest Digital Radio Communication", Science News Paper, Jan. 2002, 2 pages (With English translation).
John Wiley and Sons Inc., "Independent Component Analysis", ICA by Maximization of Nongaussianity, 2001, pp. 164-196.

\* cited by examiner

*Primary Examiner* — Don N Vo
(74) *Attorney, Agent, or Firm* — Oblon, Spivak, McClelland, Maier & Neustadt, L.L.P.

(57) ABSTRACT

A signal reception time period detector is disclosed. The signal reception time period detector includes a signal separation portion configured to decompose into signal components a received signal composed of plural signals which are overlapped at least partially in a period during which the received signal is transmitted, and a reception time period detection portion configured to detect a time period during which the signal components are received based on the signal components.

21 Claims, 31 Drawing Sheets

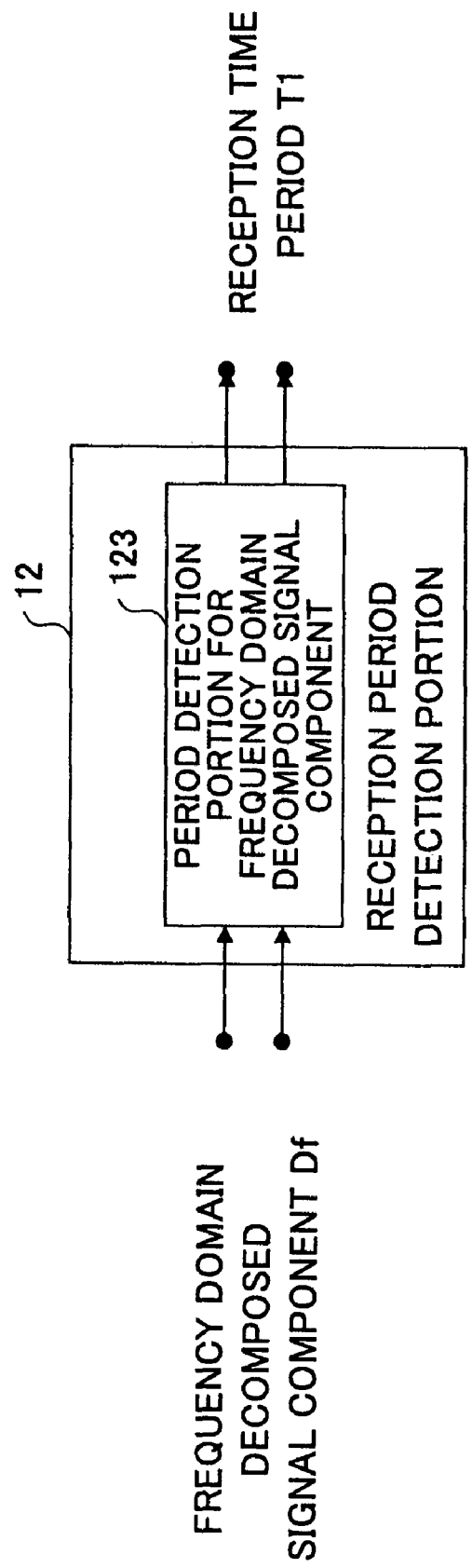

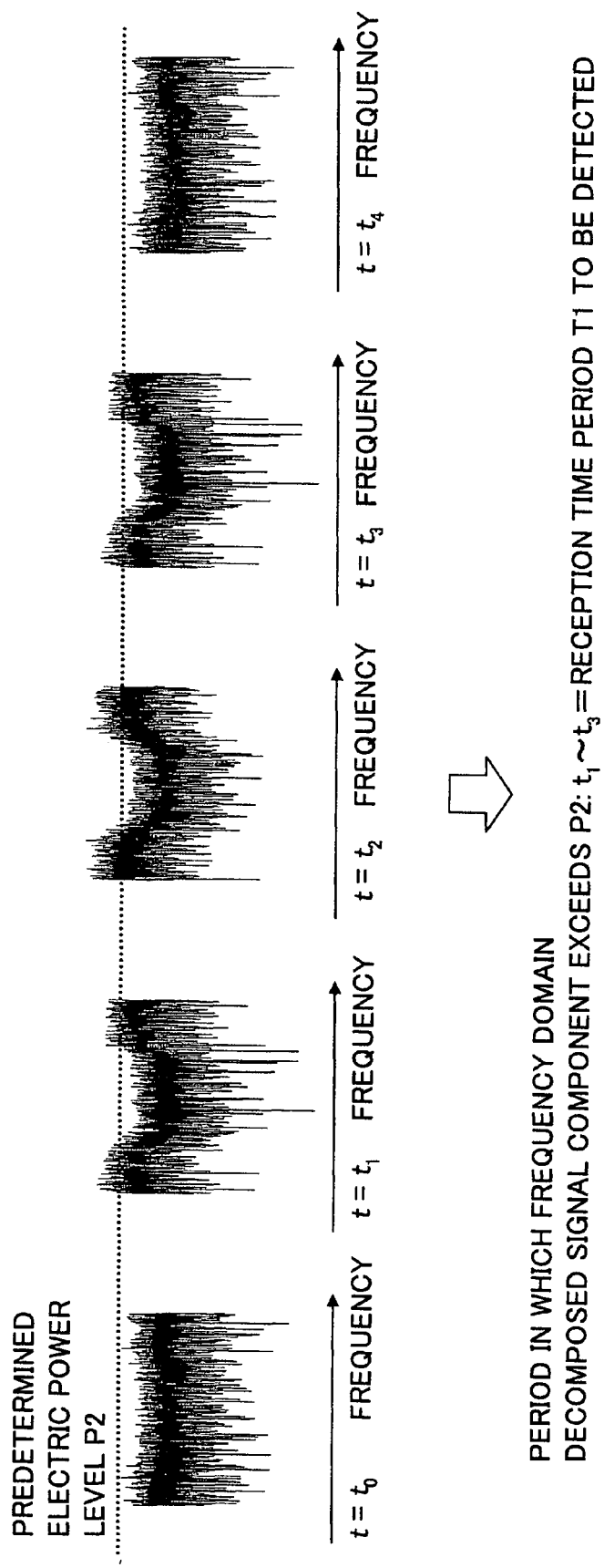

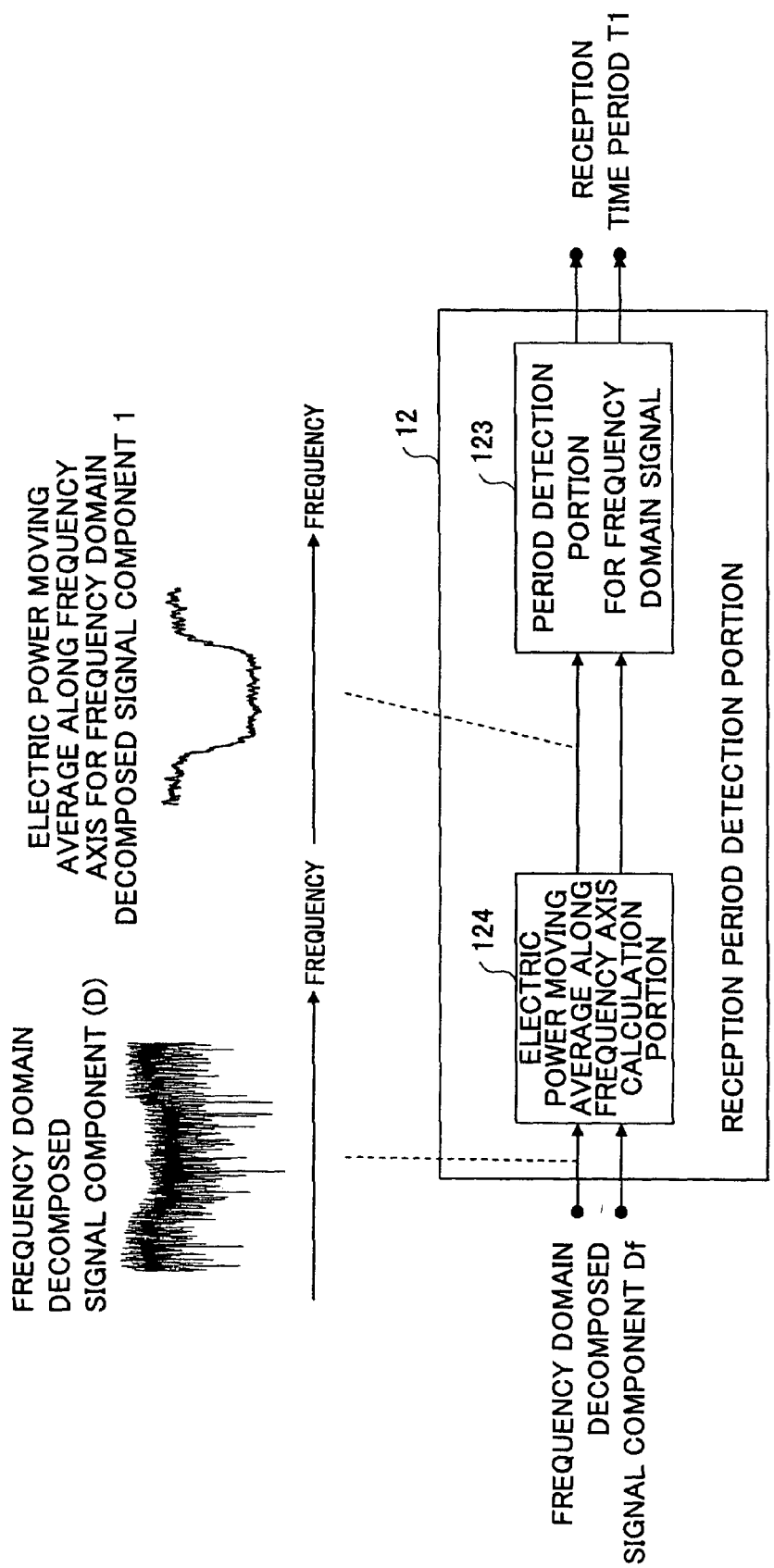

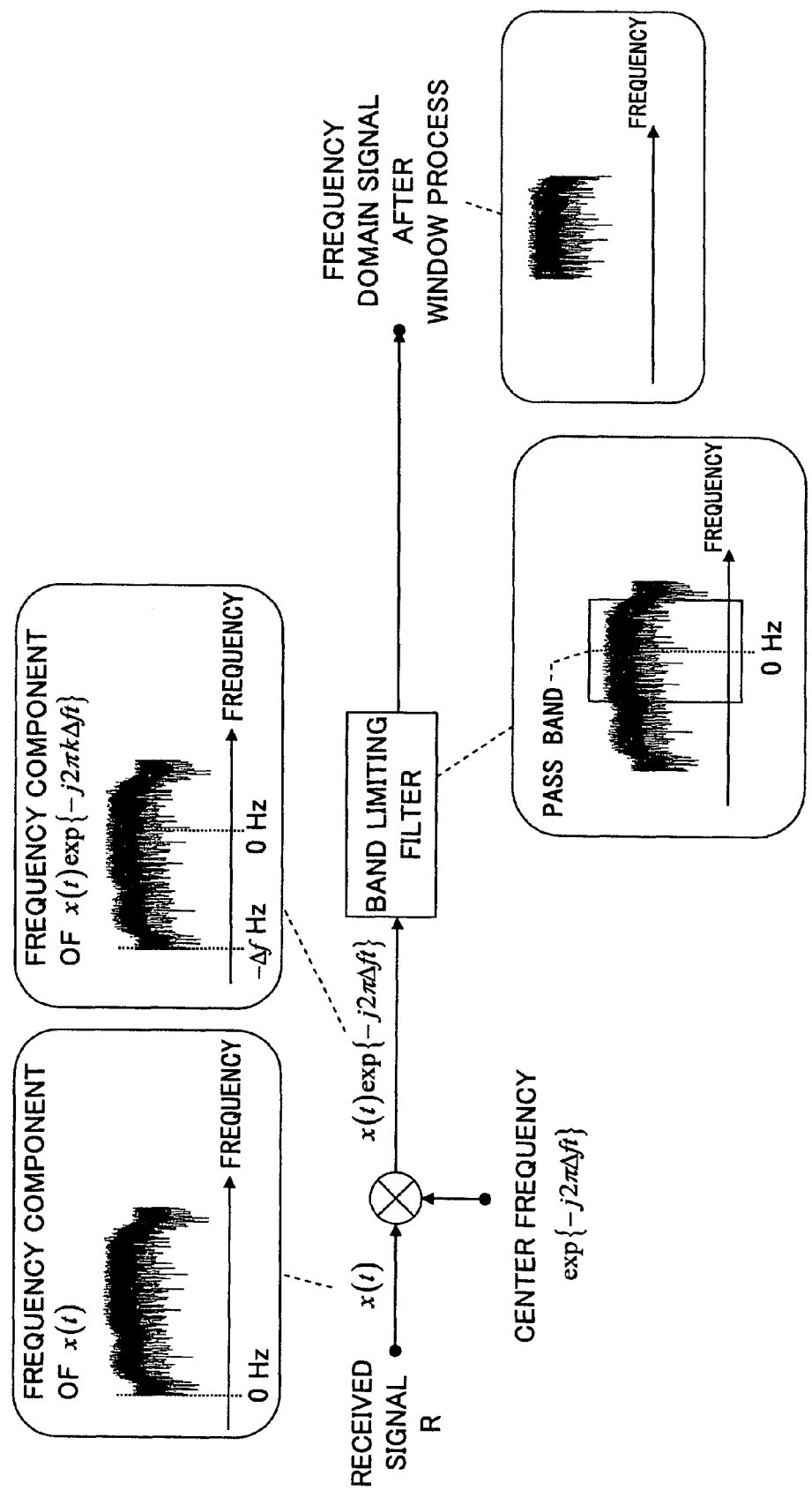

SIGNAL RECEPTION TIME PERIOD DETECTOR

BACKGROUND OF THE INVENTION

1. Field of the Invention

This invention relates to a signal reception period detector suitable for a wireless receiver.

2. Description of the Related Art

Technology that can suppress interference affecting a received signal is becoming more important in the wireless communications systems in order to efficiently use the limited frequency resources.

Use of an interference canceller that removes interference signals from a received signal is being considered as a measure to improve frequency utilization efficiency. When using a signal processing technology, for example, a successive signal separation technology, so as to remove interference signals included in a received signal, a signal reception time period of a signal component in the received signal needs to be detected and a replica is subtracted from the received signal in the signal reception time period, thereby suppressing the interference affecting the other signal components (see non-patent document 1).

Although a method of interference canceling that uses the maximum likelihood estimation (see non-patent document 2) or the minimum mean square error method (see non-patent document 3) can be used, when reception timing of the signal component included in the received signal is unknown, a sufficient effect is not demonstrated. Therefore, it is important to recognize the reception time period of each signal component.

Methods of detecting the reception time periods of the signal components in the received signal include a method based on correlation detection (see non-patent document 4, for example). According to this method, a correlation value is calculated by multiplying the received signal by a symbol sequence prescribed by a receiver and a transmitter, and a peak in the correlation value found as a result of the calculation is detected, thereby enabling detection of a reception start time of the signal, as shown in FIG. 1.

[Non-patent document 1] "V-BLAST: An Architecture for Realizing Very High Data Rates Over the Rich-Scattering Wireless Channel" Proc. ISSSE 98, September 1998.

[Non-patent document 2] "Interference Canceling Equalizer (ICE) for Mobile Radio Communications", IEEE Trans. Vehicular Technology, November 1997.

[Non-patent document 3] "An efficient square-root algorithm for BLAST", International conference on Acoustics, Speech, and Signal Processing (ICASSP), July 2000.

[Non-patent document 4] "State of the art digital mobile communications", supervised Keiji Tachikawa, Kagaku Newspaper Publishing, p. 162, January 2002.

[Non-patent document 5] "Independent Component Analysis", John Wiley & Sons, Inc., 2001.

However, there are the following disadvantages in the aforementioned related art technologies.

Regarding the timing detection method based on the correlation detection, when the length of a prescribed symbol sequence is large enough, the reception timing of the signal component can be easily detected. However, both the transmitter and the receiver have to share the prescribed symbol sequence in the method, and the correlation detection cannot be successfully performed when the transmitter and the receiver cannot cooperatively process a signal, which is, for example, sent from a different system with a different symbol sequence.

In addition, when the interference signal has a significant influence on the received signal, the symbol sequence has to be long enough to detect the correlation peak, which reduces the efficiency of spectrum usage. Additionally, if the symbol sequence used is not sufficiently long, it becomes extremely difficult to detect the reception timing of the signal component.

The present invention has been made in view of the above and may eliminate at least one of the above disadvantages. Namely, the present invention provides a signal reception period detector that is capable of detecting a reception time period for each signal component even when plural signals whose parameters are unknown are received concurrently.

SUMMARY OF THE INVENTION

An embodiment of the present invention provides a signal reception time period detector including a signal separation portion configured to decompose into signal components a received signal composed of plural signal components which are overlapped at least partially in a period during which the received signal is transmitted; and a reception time period detection portion configured to detect a time period during which the signal components are received based on the signal components.

With such a configuration, even when plural signals are transmitted concurrently, a time period of each signal can be detected.

In the above signal reception time period detector, the signal separation portion may decompose the received signal into the signal components in accordance with independency of the signal components.

With such a configuration, it becomes possible to separate signal components from the received signal using independency of the signal components, thereby making it possible to detect a reception time period.

In the above signal reception time period detector, the signal separation portion may receive received signals output from plural antennas and perform Gaussian elimination for signal components whose channel states are known so as to detect other signal components that are interfered by the signal components with known channel state information.

Since a signal component with known channel state information can be suppressed by the Gaussian elimination, a reception time period of other signal components interfered by the signal component can be easily detected.

In the signal reception time period detector, the signal separation portion may decompose the received signal into signal components in the time domain.

This makes it possible to accurately detect the signal components by utilizing a disproportionality of distribution of the signal components, which are disproportionately distributed in the time domain, and therefore, the reception time period can be detected accurately.

Additionally, in the signal reception time period detector, the signal separation portion may include a Fourier transformation portion configured to convert the received signal in the time domain into a frequency domain signal, where the frequency domain signal is decomposed into signal components in the frequency domain.

This makes it possible to accurately obtain signal components by utilizing a disproportionality of the distribution of the signal components, which are disproportionately distributed in the frequency domain, and therefore, the reception time period can be detected accurately. In addition, even when the received signal includes signal components disproportionally distributed in the time domain and signal components disproportionally distributed in the frequency domain, it becomes possible to accurately detect the signal components by utilizing the disproportional distributions, which contributes to an accurate detection of the reception time period.

In the signal reception time period detector, the signal separation portion may further include an inverse Fourier transformation portion that converts the signal components in the frequency domain into time domain signal components.

Since the frequency domain signal components are reconverted to the time domain signal components, the time periods when there are the signal components obtained after the signal separation can be accurately detected.

In the signal reception time period detector, the reception time period detection portion may perform correlation detection on signal components obtained by decomposing the received signal in the time domain using a symbol sequence known by the transmitter and the receiver, thereby detecting the time periods of the signal components.

Therefore, when a symbol sequence such as a training symbols or the like is added to a signal component in advance in the transmitter, the time periods of the signal components can be accurately detected in the receiver that knows the symbol sequence, even when the signal component is severely interfered with by a strong interference signal.

In the signal reception time period detector, the reception time period detection portion may include a period detection portion that observes the fluctuation of the electric power level of each signal component obtained by decomposing the received signal in the time domain and detects the time period of the signal components based on whether the amount of variation of the observed fluctuation is equal to or greater than a predetermined value.

This makes it possible to detect the reception time periods of the signal components, even when information on transmission parameters and symbol sequences, such as the training symbols, cannot be used.

In the signal reception time period detector, the reception time period detection portion may further include a first calculation portion that calculates along the time axis a moving average of the electric power of each signal component obtained by decomposing the received signal, wherein the period detection portion detects the time periods using the moving average of the electric power.

This enables an accurate detection of the reception time periods when the signal components exist, based on the signal components obtained by decomposing the received signal.

In the signal reception time period detector, the reception time period detection portion may include a period detection portion that uses the signal components obtained by decomposing the received signal in the frequency domain and detects the time periods based on presence or absence of a frequency band having an electric power level greater than a predetermined value.

This enables an easy detection of the reception time periods of the signal components obtained by decomposing the received signal by using the frequency domain signal.

In the signal reception time period detector, the reception time period detection portion may further include a second calculation portion that calculates along the frequency axis a moving average of electric power of each signal component obtained by decomposing the received signal in the frequency domain, wherein the reception time period detection portion detects the time periods using the moving average of the electric power.

This enables an easier detection of the signal components, thereby improving the detection accuracy of the reception time period of each signal component.

In the signal reception time period detector, the reception time period detection portion may include a noise determination portion that determines whether the signal component in the corresponding time period is noise, wherein unless the signal component is determined to be noise the corresponding time period is output as a reception time period.

This can reduce the false alarm rate by which noise is detected as a signal and thus a time period corresponding to the noise is erroneously determined to be signal reception time. Therefore, detection accuracy is improved.

In the signal reception time period detector, the noise determination portion may determine that a signal component is noise when the time period corresponding to the signal component exceeds a first predetermined value.

This makes it possible to easily distinguish a signal component from noise by comparing frame lengths, thereby improving accuracy of detecting the signal reception time period of each signal component. For example, the first predetermined value includes the maximum frame time that can be used by the transmitter, a time period having the maximum delay time caused by electromagnetic wave transmission environment added to the maximum frame time, or the like.

In the signal reception time period detector, the noise determination portion may determine that a signal component is noise when the time period corresponding to the signal component is shorter than a second predetermined value.

This makes it possible to easily distinguish a signal component from noise by comparing frame lengths, thereby improving accuracy of detecting the signal reception time period of each signal component. For example, the second predetermined value includes the minimum frame time that the transmitter can use.

In the signal reception time period detector, the noise determination portion may include a correlation detection portion configured to perform correlation detection on the received signal and the signal components obtained by decomposing the received signal in each time period corresponding to the signal components; and a correlation value comparison portion configured to determine that a signal component is noise when the correlation value obtained for the signal component by the correlation detection portion is smaller than a third predetermined value.

This makes it possible to easily distinguish a signal component from noise by utilizing a difference in correlation characteristic between a signal and noise, thereby improving accuracy in detecting the signal reception time period of each signal component.

In the signal reception time detector, the noise determination portion may include a cyclic autocorrelation detection portion that calculates a cyclic autocorrelation value for the signal components obtained by decomposing the received signal in each time period corresponding to the signal components; and a cyclostationarity-based noise determination portion that determines whether a signal component in the detected time period is a signal in accordance with the cyclic autocorrelation value detected for the signal component by the cyclic autocorrelation detection portion, and determines that the signal component is noise unless the signal component is determined to be a signal.

This makes it possible to easily determine whether a signal component obtained by decomposing the received signal in the detected time period for the signal component is noise, thereby improving accuracy in detecting the signal reception time period of each signal component.

In the signal reception time period detector, the signal separation portion can repeat the signal decomposition of a portion of the received signal, the portion corresponding to a part of the time period that has once been detected.

Such repeated decomposition of the received signal makes it possible to detect a signal component that has a low electric power level and is hidden by other signal components having a high electric power level, thereby detecting the reception time period of the signal component.

In the signal reception time period detector, the part of the time period can be set as a time range excluding at least one of reception time periods corresponding to the detected signal components.

This makes it possible to perform the signal component separation and the time period detection without being influenced by the signal component associated with the excluded reception time period detected in the previous frequency-band-detection process.

In addition, the signal reception time period detector may further include a signal suppression portion configured to suppress one or more signal components among the signal components included in the received signal to output a suppressed received signal, wherein the signal separation portion decomposes the suppressed received signal into signal components.

Since the received signal from which one or more signal components are suppressed is decomposed into signal components and then a time period is detected from the signal components obtained by decomposing the suppressed received signal, the time period detection can be successfully performed free from an influence that the signal components would have if they were not suppressed.

In the signal reception time period detector, the signal separation portion may extract a portion of the received signal using a time window having a predetermined width and decompose the extracted received signal into signal components in the time domain.

Since the received signal is decomposed in a shorter span of time by using the time window, a sensitive signal separation becomes possible. Additionally, the signal separation is not necessarily conducted for the entire time period when the received signal is input, thereby reducing the amount of calculation required for detection of the reception time periods of the signal components.

In the signal reception time period detector, the signal separation portion may extract a portion of the received signal using a frequency window having a predetermined width and decompose the extracted received signal into signal components in the frequency domain.

Since the received signal is decomposed in a narrower span of frequency by using the frequency window, a sensitive signal separation becomes possible. Additionally, the signal separation is not necessarily conducted for the entire frequency range where the received signal is input, thereby reducing the amount of calculation required to detect the reception time periods of the signal components.

According to the embodiments of the present invention, the reception time periods of the signal components can be detected even when the received signal composed of plural signal components whose parameters are unknown is received.

BRIEF DESCRIPTION OF THE DRAWINGS

FIG. 13A is a block diagram of a reception time period detecting portion using a frequency domain decomposed signal component;

FIG. 13B is a schematic view explaining a method of determining the reception time period using the frequency domain decomposed signal component;

FIG. 14 is a block diagram of a reception time period detecting portion using a moving average of electric power along the frequency axis;

FIG. 30 is a block diagram of a frequency window process portion.

DETAILED DESCRIPTION OF THE PREFERRED EMBODIMENTS

Next, referring to the accompanying drawings, embodiments of the present invention will be described. In all the drawings for describing the embodiments, similar or corresponding reference marks are given to similar or corresponding components or members, and undue repetition of descriptions is omitted.

A First Embodiment

Figure 1:
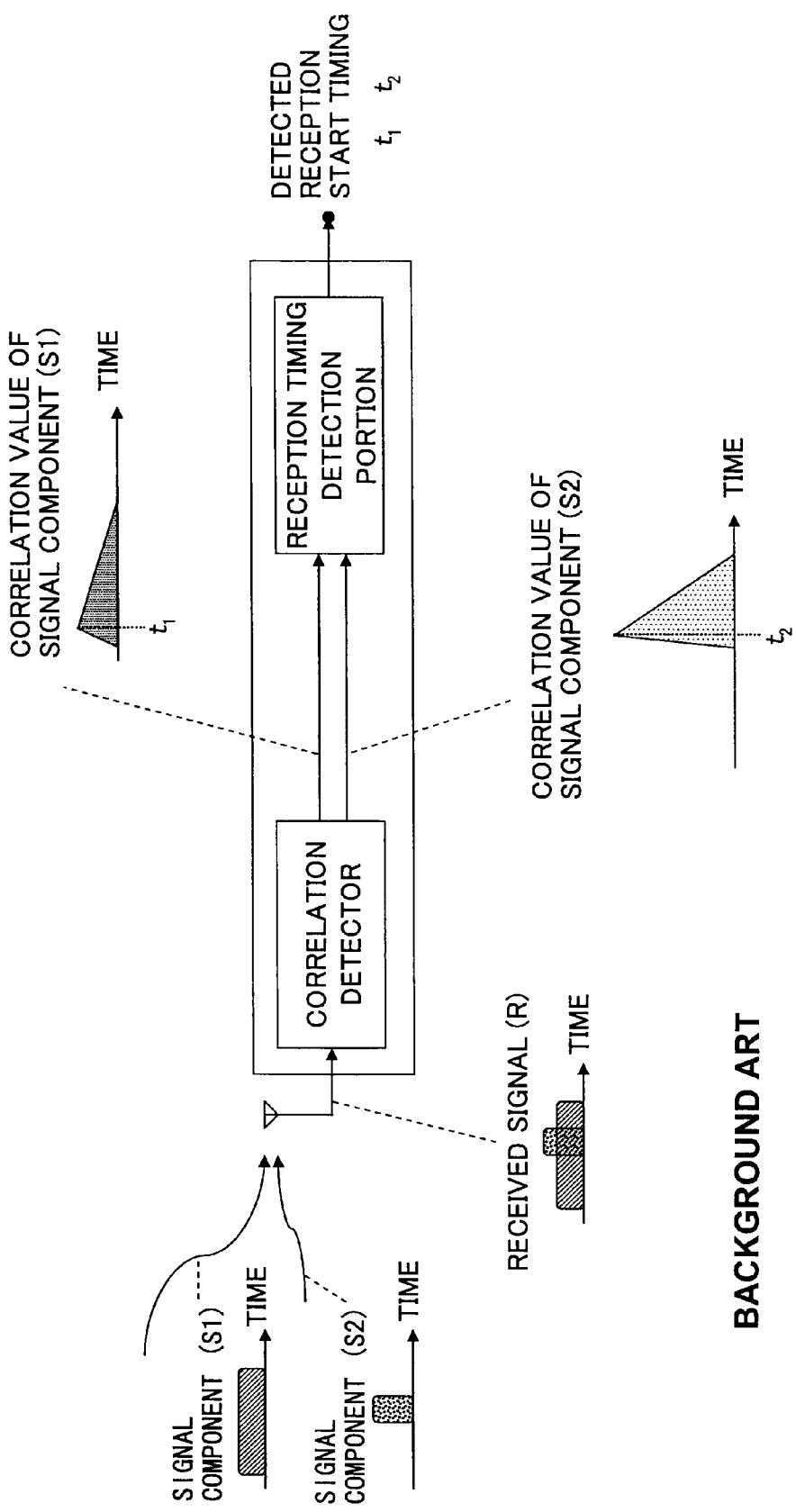
FIG. 1 is a block diagram of a method of detecting reception timing based on correlation detection.
Figure 2:
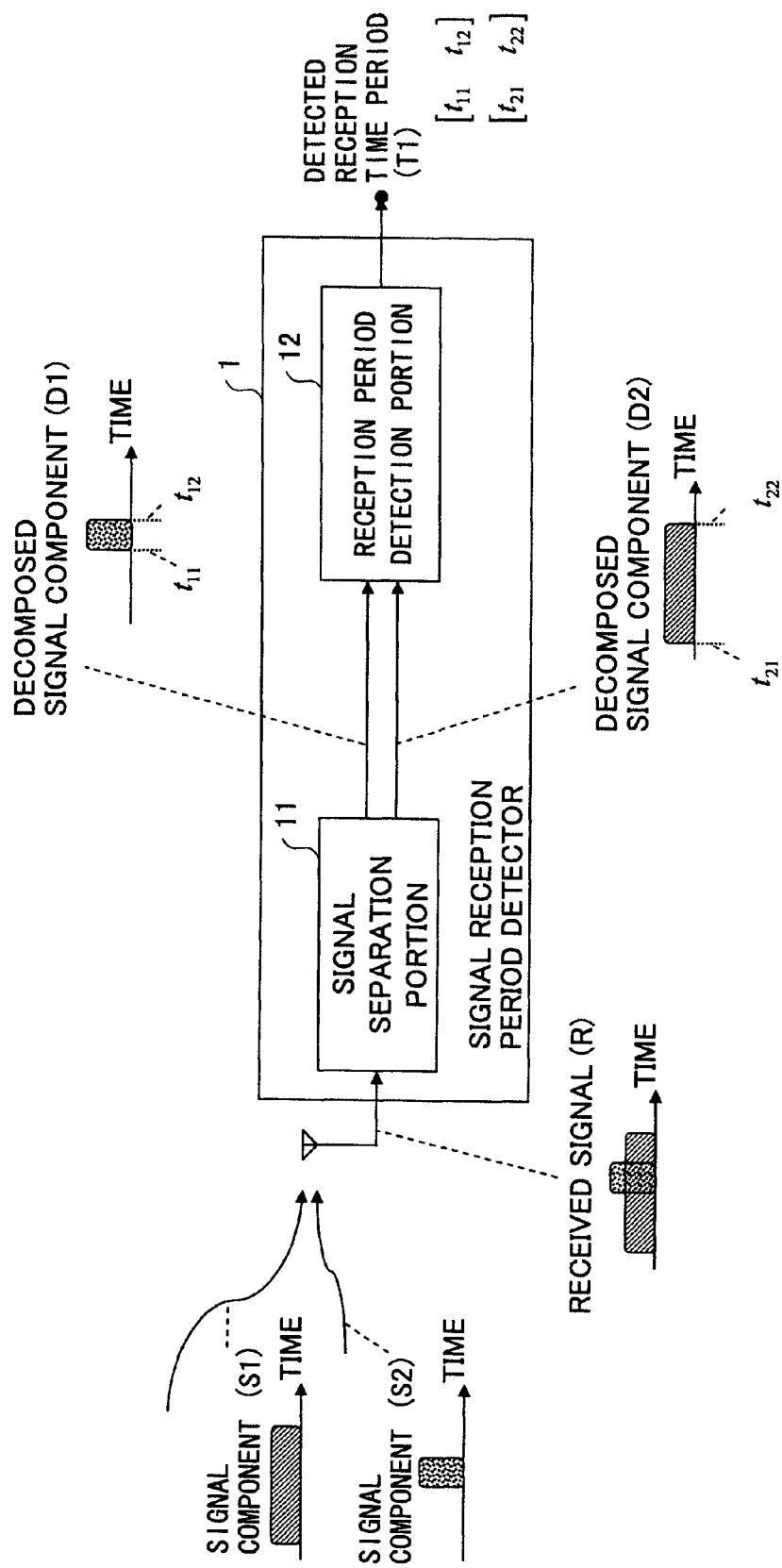
FIG. 2 is a partial block diagram of a signal reception time period detector according to a first embodiment of the present invention.

Referring to FIG. 2, a signal reception period detector 1 according to a first embodiment of the present invention is described.

The signal reception period detector 1 according to the first embodiment is composed of a signal separation portion 11 and a reception period detection portion 12.

A received signal R is separated into signal components by the signal separation portion 11 of the signal reception period detector 1. Hereinafter, a signal component obtained through the signal separation process is referred to as a "decomposed signal component D" in order to clearly distinguish the separated signal components from signal components S that are originally included in the received signal R. Namely, the received signal R, which is, for example, composed of a signal component S1 and a signal component S2, is separated into a decomposed signal component D1 and a decomposed signal component D2, respectively by the signal separation portion 11. In such a signal separation process, wave shapes of the decomposed signal component D are output while signal determination is not performed.

In this embodiment of the present invention, the received signal R is composed of plural signal components whose transmission time periods are overlapped at least partially.

Additionally, a time period from t11 to t12 is described as [t11, t12], hereinafter. For example, when a received signal generated by superposing the signal component (S1) of a time period [t11, t12] and the signal component (S2) of a time period [t21, t22] is received, the signal separation portion 11 separates the received signal through a prescribed signal separation process (described later) so as to produce the decomposed signal component (D1) of a time period [t11, t12] and the decomposed signal component (D2) of a time period [t21, t22].

After the decomposed signal components D (D1, D2) are obtained by the signal separation portion 11, the decomposed signal components D are input into the reception period detection portion 12. Upon reception of the decomposed signal components D, the reception period detection portion 12 detects from the decomposed signal components D a time period during which each of the signal components S included in the received signal R is output. In other words, the reception period detection portion 12 detects the reception time period [t11, t12] of the decomposed signal component (D1) and the reception time period [t21, t22] of the decomposed signal component (D2) and outputs these reception time periods as a reception time period T1.

In other words, when the signal component (D1) of the reception time period [t11, t12] and the signal component (D2) of the reception time period [t21, t22] are input, the reception period detection portion 12 outputs the reception time period [t11, t12] of the signal component (S1) and the reception time period [t21, t22] of the signal component (S1) as the reception time period T1.

By the way, the signal separation portion 11 may separate the received signal R into decomposed signal components by performing a blind process that generates a signal based on a statistical characteristic of the signal components as described below. In addition, the signal separation portion 11 may receive received signals from plural antennas and perform Gaussian elimination for eliminating signal components in the received signals using known channel state information.

Figure 3:
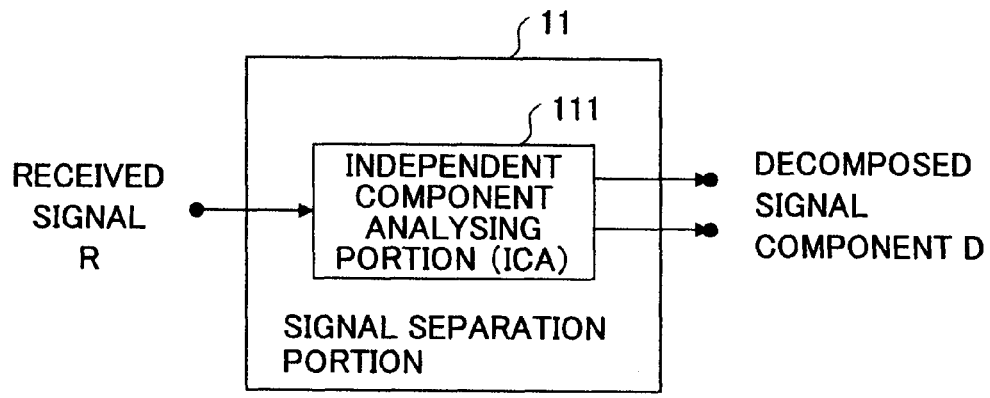
FIG. 3 is a block diagram of a signal separation portion based on Independent Component Analysis.

Next, an example of the signal separation portion 11 is explained, referring to FIG. 3.

The signal separation portion 11 has an independent component analysis portion 111. The independent component analysis portion 111 obtains the decomposed signal components D from the received signal R based on the independency of the signal components S. The independent component analysis can separate statistically independent signal components by utilizing only the "independency of signal components", without recognizing other parameters (see reference document 5, for example).

Figure 4:
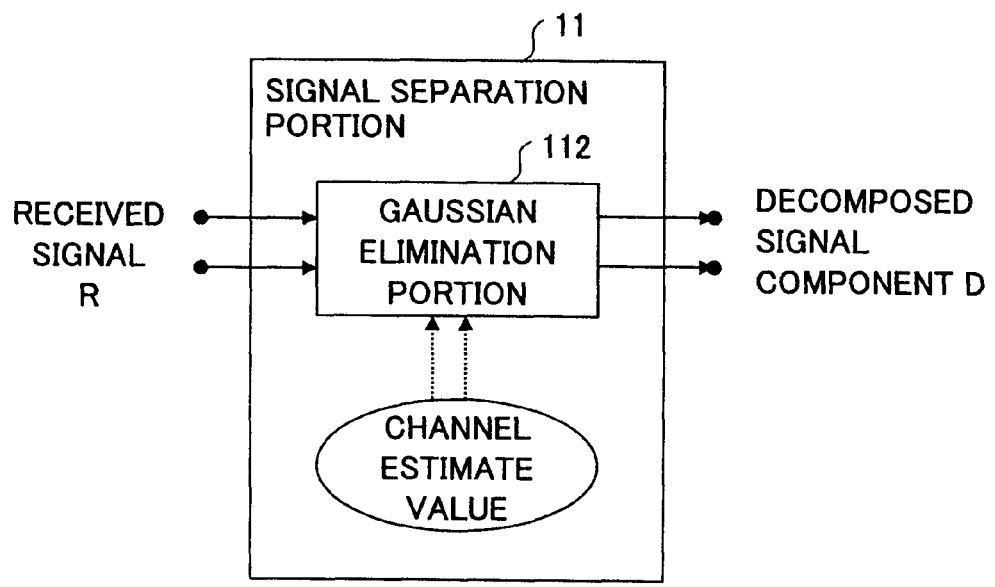
FIG. 4 is a block diagram of a signal separation portion based on Gaussian elimination.

Next, another example of the signal separation portion 11 is explained, referring to FIG. 4.

The signal separation portion 11 in FIG. 4 has a Gaussian elimination portion 112. The Gaussian elimination portion 112 performs Gaussian elimination on the received signals input from plural antennas. Below, the Gaussian elimination is described in detail. When the received signal R composed of the signals input from plural antennas is expressed by a matrix, there is obtained r=Hs+n (1), wherein a signal components vector s and a channel matrix H are expressed by:

$$H = \begin{bmatrix} h_{11} & h_{21} \\ h_{12} & h_{22} \end{bmatrix} \quad (2)$$

$$s = [s_1 \ s_2]^T$$

then, $$r = \begin{bmatrix} r_1 \\ r_2 \end{bmatrix} = \begin{bmatrix} h_{11} & h_{21} \\ h_{12} & h_{22} \end{bmatrix} \begin{bmatrix} s_1 \\ s_2 \end{bmatrix} + n = \begin{bmatrix} h_{11}s_1 + h_{21}s_2 + n_1 \\ h_{12}s_1 + h_{22}s_2 + n_2 \end{bmatrix} \quad (3)$$

is obtained, where n is additive noise vector and $n=(n_1, n_2)^T$. If the channel state $(h_{21}, h_{22})$ of one signal component $s_2$ is known, the signal component $s_2$ can be suppressed by the linear synthesis in the receiver using the known channel state. Specifically, the signal component $s_1$ can be obtained by suppressing the influence from the signal component $s_2$ by calculating an equation:

$$h_{22}r_1 - h_{21}r_2 = (h_{11}h_{22} - h_{12}h_{21})s_1 + (h_{22}n_1 - h_{21}n_2) \quad (4)$$

Thus, when there is a signal component whose channel state is known, another signal component under the influence of the signal component can be easily detected by suppressing the signal component whose channel state is known using the Gaussian elimination.

By the way, the receiver does not have to recognize the channel state about the other signal component that is not subjected to signal suppression. Even so, the reception time period of the other signal component, which is not a signal component whose channel state is known, can be detected with high accuracy.

Figure 5:
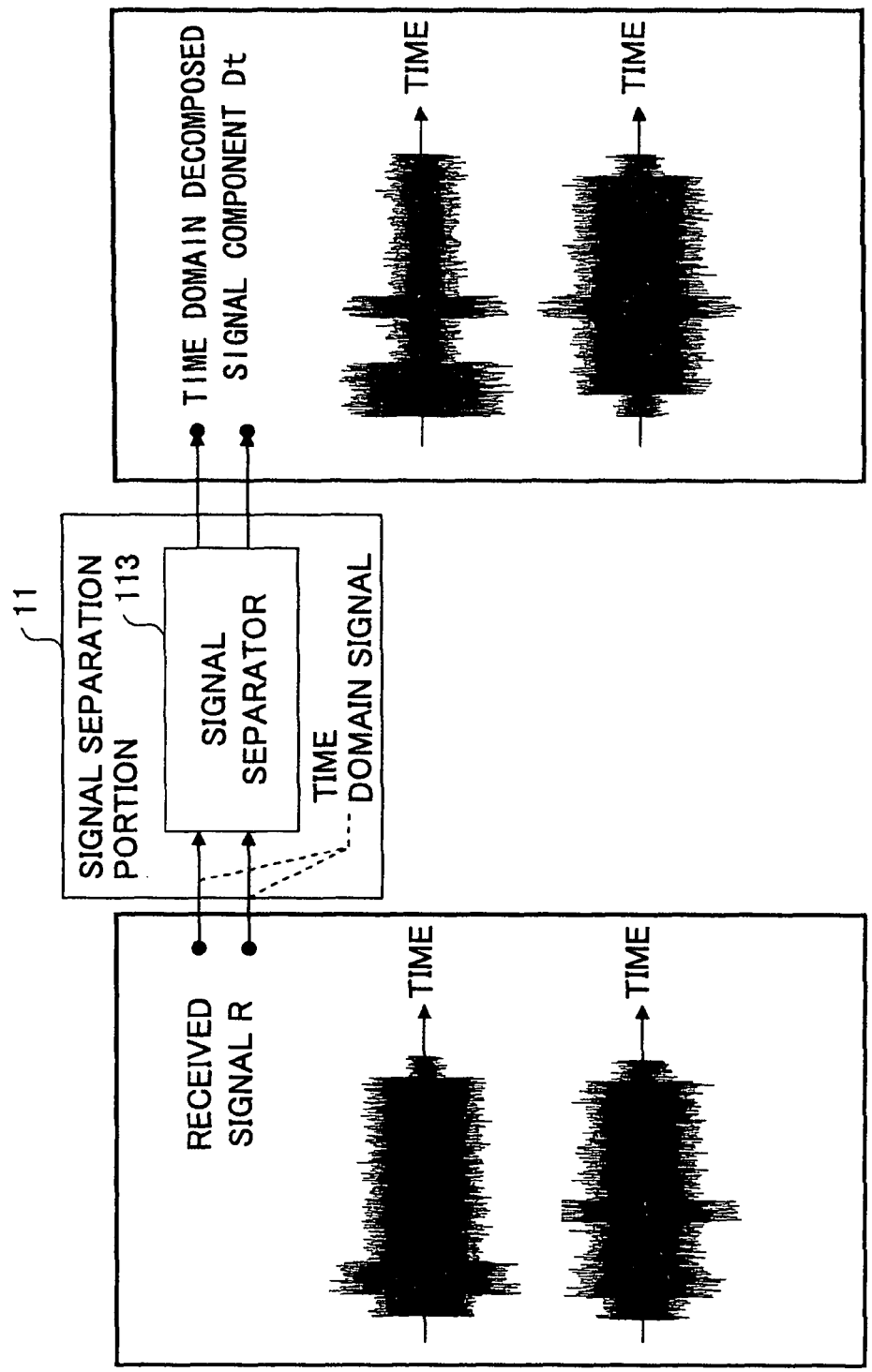
FIG. 5 is a block diagram of a signal separation portion using a time domain signal.

Next, another example of the signal separation portion 11 is explained, referring to FIG. 5.

The signal separation portion 11 in FIG. 5 has a signal separator 113. The signal separator 113 receives the received signal R in the time domain and performs a batch separation process on the signals included in the received signal R of a prescribed time period. Namely, the signal separation portion 11 decomposes the received signal R into the time domain decomposed signal components Dt and outputs the time domain decomposed signal components Dt.

When signals are separated by performing time domain processing, especially, by utilizing a method such as the independent component analysis based on a signal distribution, the signal components that are disproportionally distributed can be effectively separated.

As an example of signals that are disproportionally distributed, there are an MSK modulation signal whose amplitude is constant, and a CDMA signal.

Figure 6:
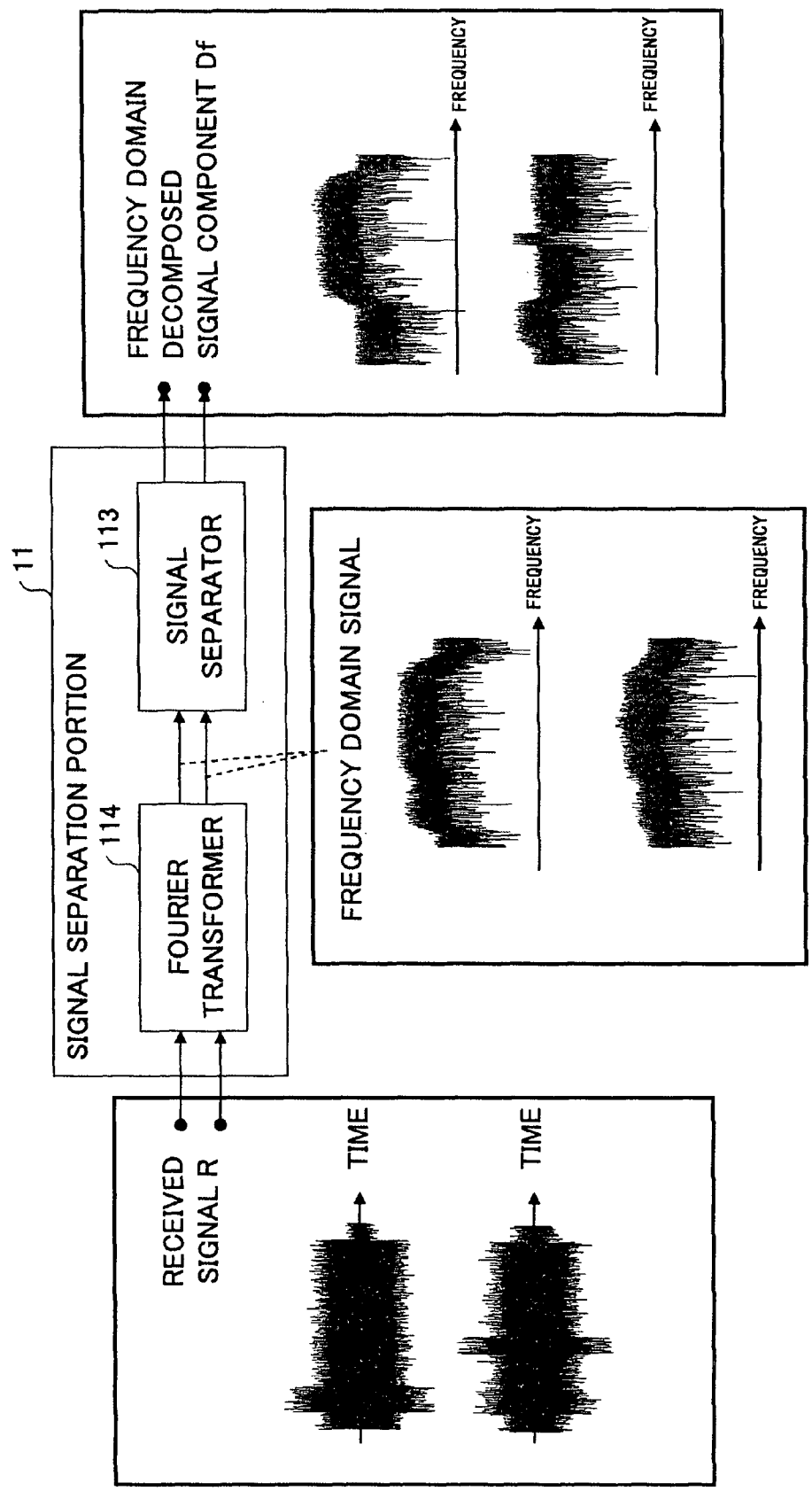
FIG. 6 is a block diagram of a signal separation portion using a frequency domain signal.

Next, another example of the signal separation portion 11 is explained, referring to FIG. 6.

The signal separation portion 11 in FIG. 6 has a Fourier transformer 114 and a signal separator 113. The received signal R in the time domain is converted into a frequency domain received signal by the Fourier transformer 114, and the converted received signal is decomposed into frequency domain signal components by the signal separator 113. Then, the signal components are output as frequency domain decomposed signal components Df.

As stated, when signal components disproportionately distributed in the frequency domain are input, the signal components are effectively separated by such frequency domain processing. Moreover, influence of the delay wave can be eliminated by separating the frequency domain signals. As an example of the signals that are disproportionately distributed in the frequency domain, there is a signal generated by an OFDM modulation method.

Figure 7:
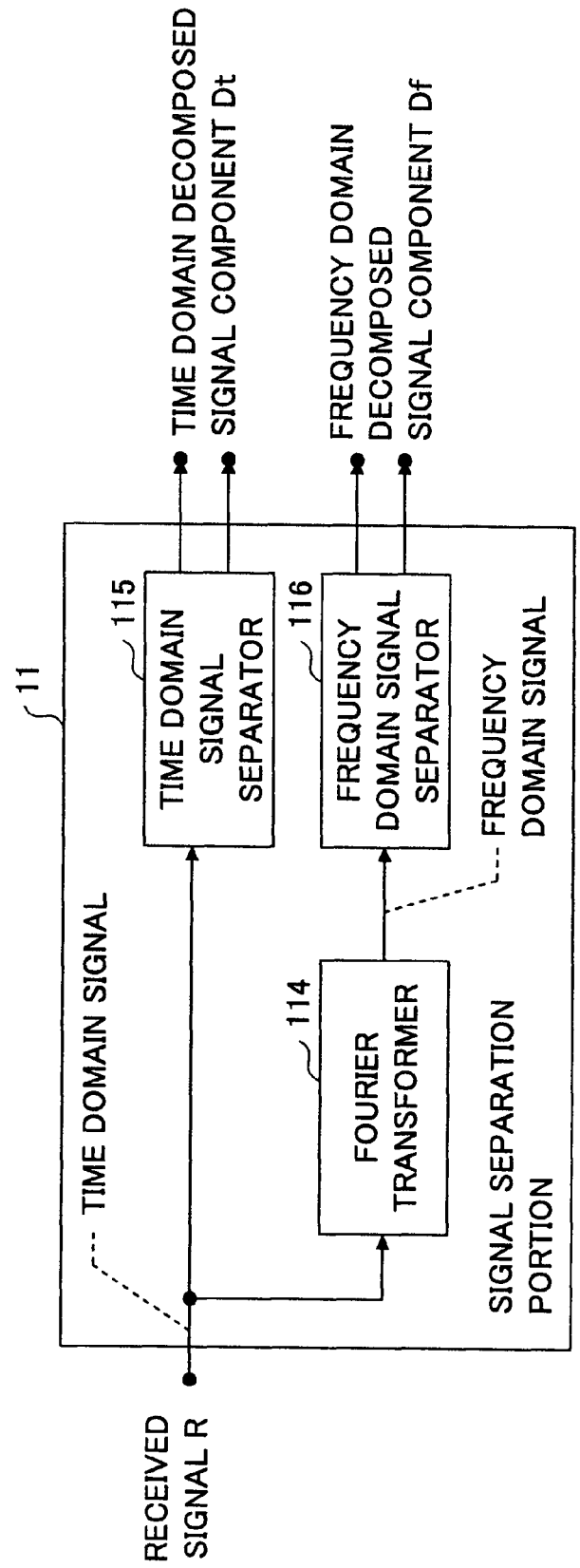
FIG. 7 is a block diagram of a signal separation portion using both the time domain signal and the frequency domain signal.

Next, another example of the signal separation portion 11 is explained, referring to FIG. 7.

The signal separation portion 11 in FIG. 7 has a time domain signal separator 115, the Fourier transformer 114, and a frequency domain signal separator 116. The received signal R in the time domain is input to the time domain signal separator 115 that receives the received signals and decomposes the received signals into the time domain decomposed signal components, and concurrently to the Fourier transformer 114. The received signal R input to the Fourier transformer 114 is converted into a frequency domain received signal which is then input to the frequency domain signal separator 116 that receives the frequency domain received signals and decomposes the received signals into the frequency domain decomposed signal components.

Therefore, the time domain signal separator 115 decomposes the time domain received signal into the time domain decomposed signal components Dt and outputs the time domain decomposed signal components Dt. The frequency domain signal separator 116 decomposes the frequency domain received signal into the time domain decomposed signal component Dt and outputs the time domain decomposed signal components Dt.

According to the signal separation portion 11 shown in FIG. 7, even when the signals distributed disproportionately in the time domain and the signals distributed disproportionately in the frequency domain are included in the received signal R, these signal components can be effectively separated.

Figure 8A:
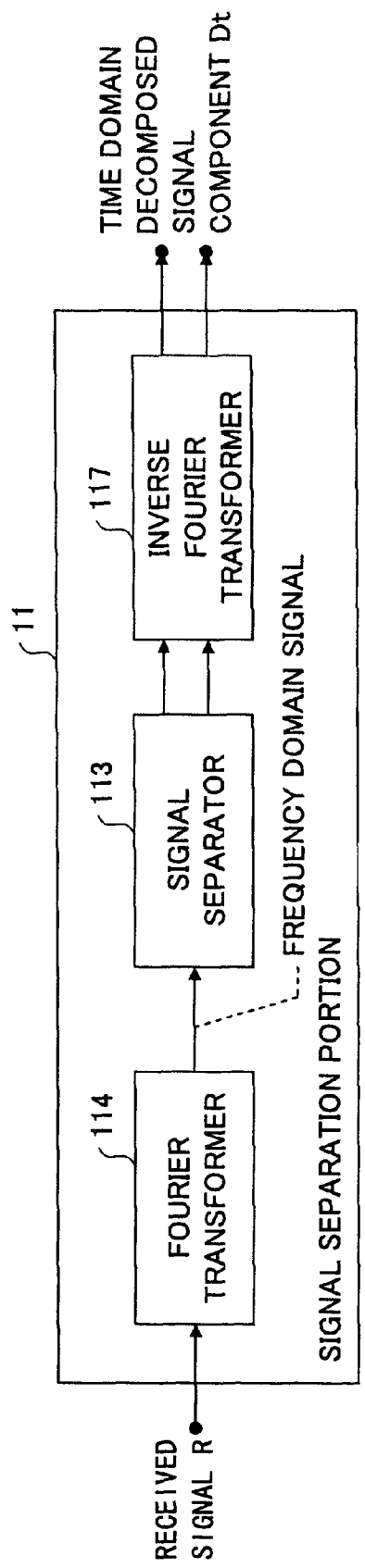
FIG. 8A is a block diagram of a signal separation portion using a time domain signal to which a frequency domain signal is reconverted.
Figure 8B:
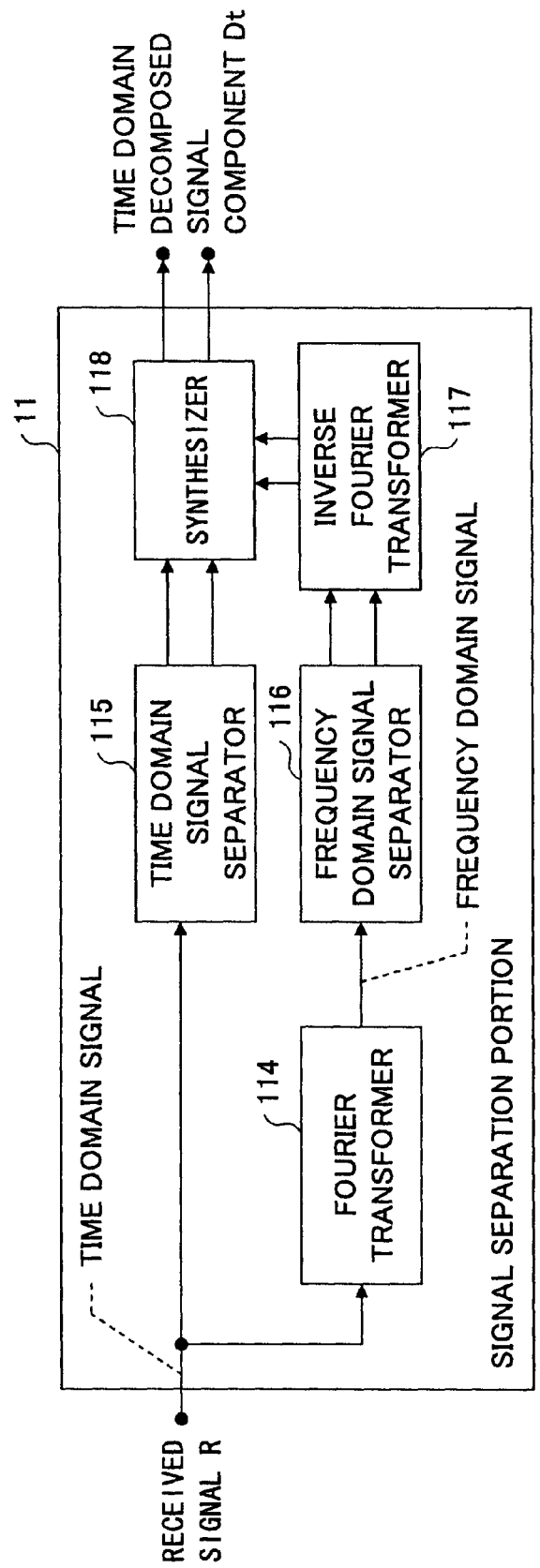
FIG. 8B is another block diagram of a signal separation portion.

Next, another example of the signal separation portion 11 is explained, referring to FIGS. 8A and 8B.

The signal separation portion 11 in FIG. 8A has the Fourier transformer 114, the signal separator 113, and an inverse-Fourier transformer 117. The received signal R in the time domain is converted into a frequency domain received signal by the Fourier transformer 114, and the converted received signal is output to the signal separator 113. The signal separator 113 separates the converted received signal into frequency domain decomposed signal components, and outputs the decomposed signal components to the inverse-Fourier transformer 117. The inverse-Fourier transformer 117 converts the input frequency domain decomposed signal components into time domain decomposed signal components, and outputs the reconverted signal components as time domain decomposed signal components Dt.

As stated, the signal separation portion 11 can reconvert the frequency domain decomposed signal components to the time domain decomposed signal components. Due to the re-conversion, the signal period detection can be performed based on a time domain signal, thereby realizing a highly accurate detection of a signal time period.

In addition, the signal separation portion 11 has the Fourier transformer 114, the time domain signal separator 115, the frequency domain signal separator 116, a synthesizer 118, and the inverse-Fourier transformer 117 as shown in FIG. 8B. The received signal R in the time domain is input to the time domain signal separator 115 and concurrently to the Fourier transformer 114. In the time domain signal separator 115, the received signal is separated into time domain decomposed signal components, and the decomposed signal components are input to the synthesizer 118.

The Fourier transformer 114 converts the received signal R in the time domain into a frequency domain received signal, and outputs the converted signal to the frequency domain signal separator 116. The frequency domain signal separator 116 separates the input frequency domain received signal into frequency domain decomposed signal components, and outputs the separated signal components to the inverse-Fourier transformer 117. The inverse-Fourier transformer 117 converts the frequency domain decomposed signal components into time domain decomposed signal components, and outputs the converted signal components to the synthesizer 118. The Synthesizer 118 synthesizes the decomposed signal components received from the time domain signal separator 115 and the decomposed signal components received from the inverse-Fourier transformer 117, thereby outputting the synthesized signal components.

Figure 9:
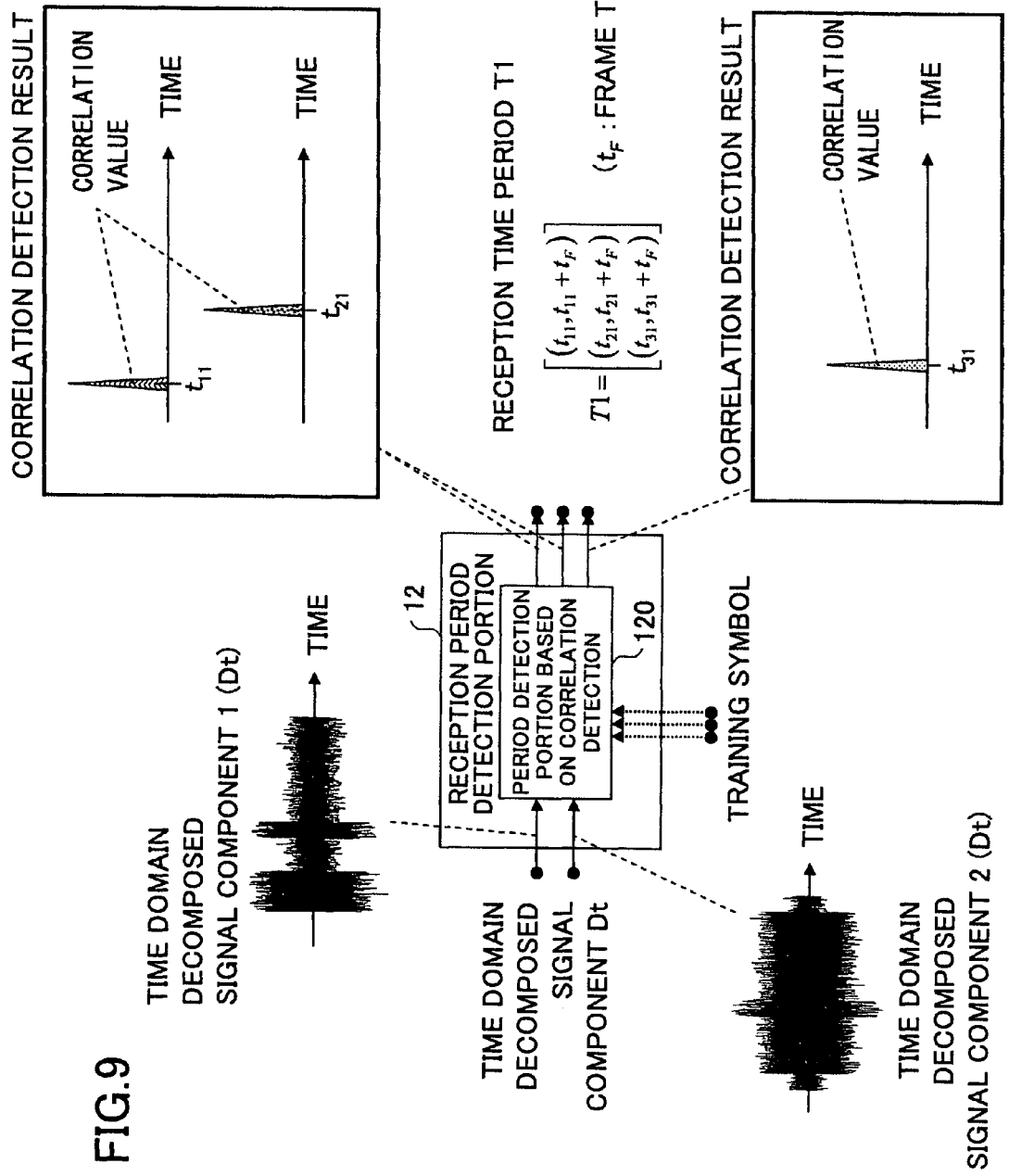
FIG. 9 is a block diagram of a reception time period detecting portion based on correlation detection.

Next, an example of the reception period detection portion 12 is explained, referring to FIG. 9.

The reception period detection portion 12 has a period detection portion 120 that functions in accordance with correlation detection. The period detection portion 120 based on the correlation detection acts on the signal components included in the received signal under predetermined conditions based on a symbol sequence, such as a training symbols, a pilot symbol, or the like, predetermined by a transmitter and a receiver.

The training symbols are adopted in the following explanation, but a known symbol sequence, such as the pilot symbol or the like, is also applicable.

Since the period detection portion 120 performs the correlation detection using the training symbols for the decomposed signal component D output from the signal separation portion 11, it becomes possible to perform the correlation detection free from any interference from another signal component S included in the received signal R. As a result, the reception timing of a signal component in the received signal R can be highly accurately detected compared with a situation where the correlation detection is performed directly on the received signal R. By the way, when a frame length of a signal is constant, the reception time period T1 can be easily calculated by detecting a reception start timing of the signal component.

FIG. 9 shows an example of a frame in which a known symbol sequence is located in the head of the frame. Even if the known symbol sequence is located in the other than the head of the frame, when the receiver knows the position where the known symbol sequence is located in the frame, the reception time period of the signal components can be easily detected. Additionally, when the known symbol sequence is added to the top of the frame and the end of the frame, the reception timing of the signals can be detected easily and accurately by the correlation detection even if the frame length is unknown at the receiver.

Figure 10:
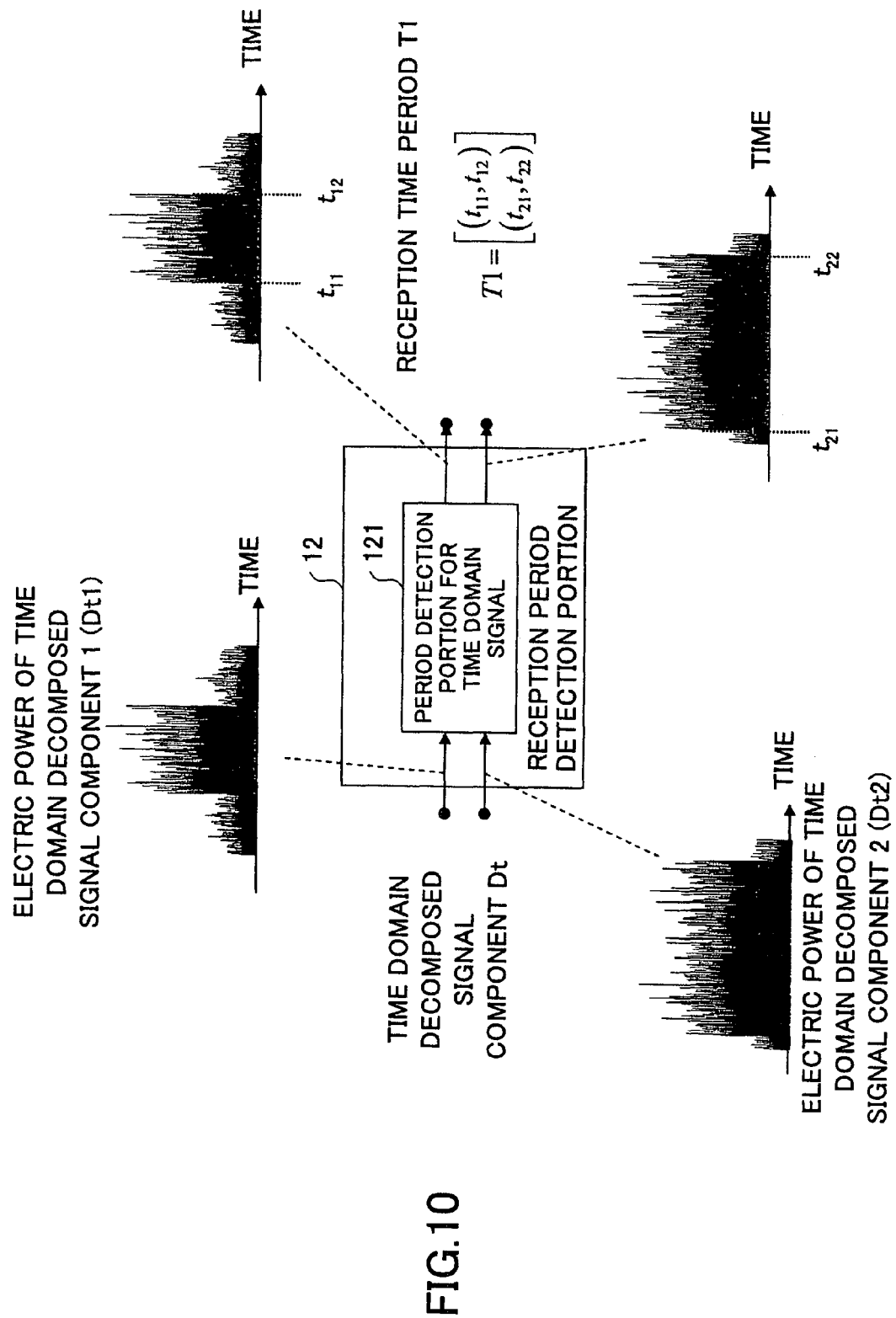
FIG. 10 is a block diagram of a reception time period detecting portion using a time domain decomposed signal component.

Next, another example of the reception period detection portion 12 is explained, referring to FIG. 10.

The reception period detection portion 12 in FIG. 10 has a period detection portion 121 that acts on the time domain signal. The period detection portion 121 detects the time periods of the signal components S through the time domain decomposed signal components Dt obtained by decomposing the received signal R. The period detection portion 121 observes, for example, electric power, fluctuation of the power or the amplitude of the power of the time domain decomposed signal components Dt. The period detection portion 121 detects a time when the electric power increases abruptly as the signal reception start time and a time when the electric power decreases abruptly as the reception end time. As a result, the reception time periods of the decomposed signal components are obtained by separating the received signal. In addition, the period detection portion 121 may detect the reception time periods T1 of the signal components by using an edge search based on a wavelet transform or the like.

Figure 11:
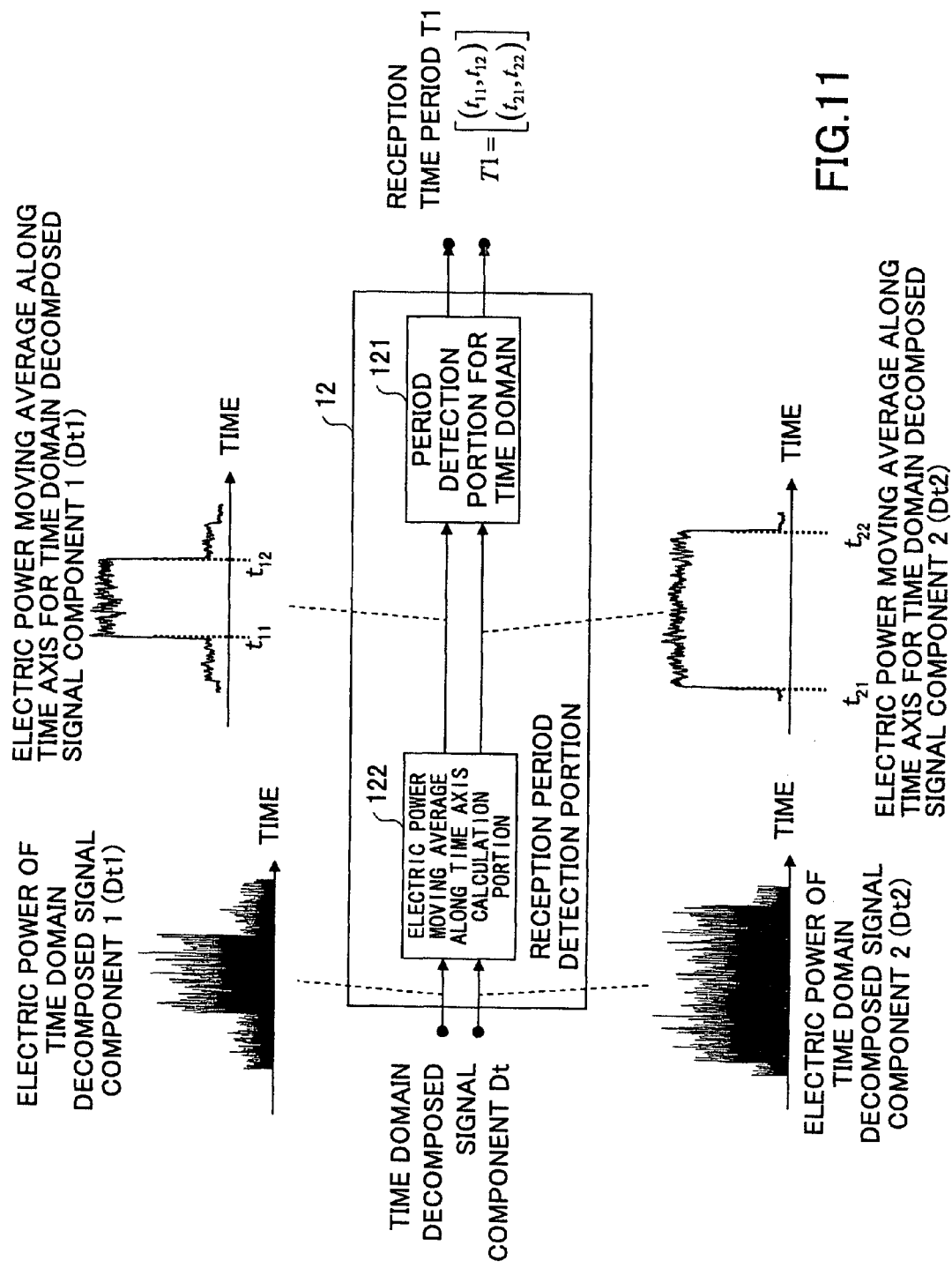
FIG. 11 is a block diagram of a reception time period detecting portion using a moving average of electric power along the time axis.

Next, another example of the reception period detection portion 12 is explained, referring to FIG. 11.

The reception period detection portion 12 in FIG. 11 has an electric power moving average along time axis calculation portion 122 and the period detection portion 121. The electric power moving average along time axis calculation portion 122 calculates moving averages of the electric power of the time domain decomposed signal components. The electric power moving average along time axis calculation portion 122 calculates electric power averages during a predetermined period and outputs the resultant averages one after another. For example, the electric power moving average along time axis calculation portion 122 receives a decomposed signal component 1 and a decomposed signal component 2 that are separated from the received signal by the signal separation portion 11. The electric power moving average along time axis calculation portion 122 observes the electric power of the time domain decomposed signal component 1 (Dt1) and the electric power of the time domain decomposed signal component 2 (Dt2), obtains moving averages of the electric powers along the time axis, and outputs the moving averages to the period detection portion 121.

Figure 12:
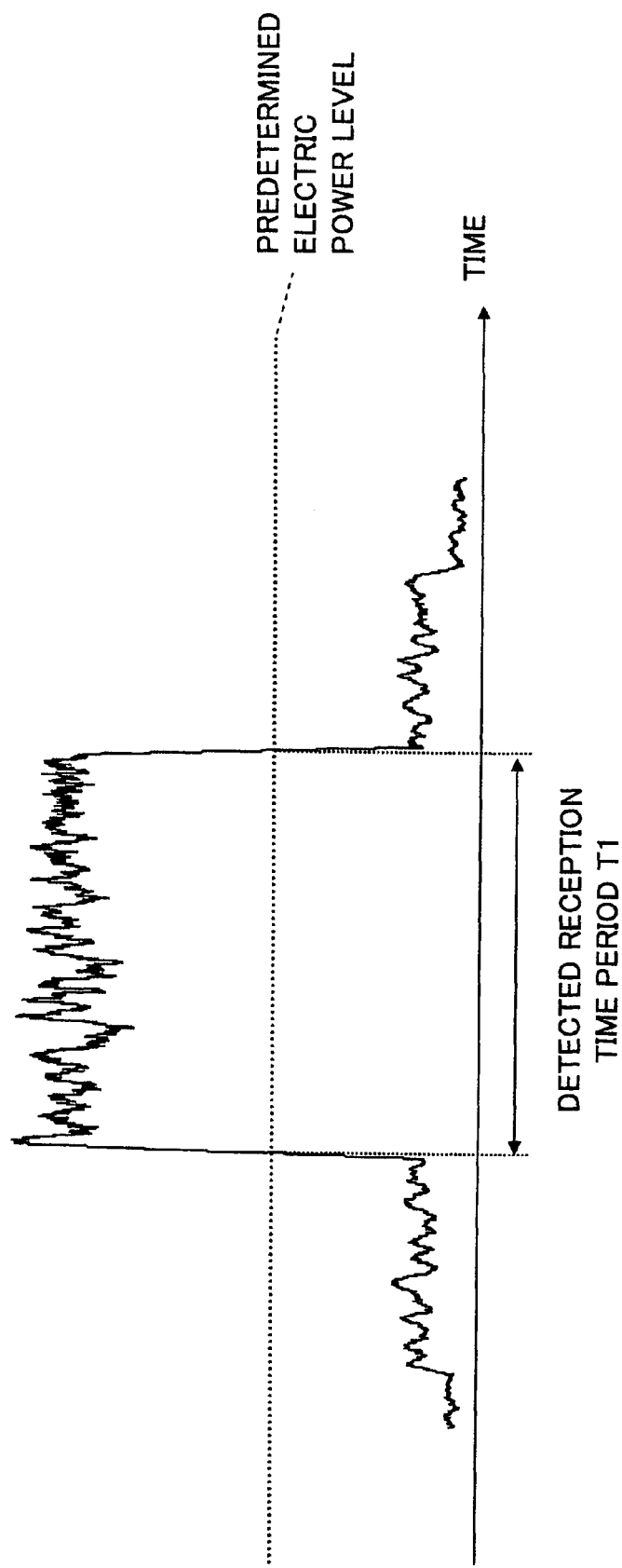
FIG. 12 is a schematic view explaining a method of determining the reception time period based on the moving average of electric power along the time axis.

The period detection portion 121 detects the reception time periods T1 of the decomposed signal components based on the moving averages of the electric power. Although the period detection portion 121 can detect the reception time period by utilizing edge detection, such as the wavelet transform method, for the moving average of the electric power, as mentioned above, the period detection portion 121 may detect as the reception time period a time period during which the moving averages of the electric power of the signal components exceeds a predetermined threshold electric power level. This is how the reception time period can be easily detected (FIG. 12).

Next, another example of the reception period detection portion 12 is explained, referring to FIG. 13A.

The reception period detection portion 12 in FIG. 13A has a period detection portion 123 that acts on the frequency domain signal. The period detection portion 123 detects the time period T1 without converting the frequency domain decomposed signal component Df to a time domain decomposed signal component Dt. Namely, the period detection portion 123 performs a predetermined process on the frequency domain decomposed signal component Df (frequency signal) and outputs the reception time period T1.

Referring to FIG. 13B, a method of detecting a time period is explained. The method can be performed in the frequency domain using a predetermined electric power level. First, an electric power value P2 in the frequency domain is determined in advance. Then, the period detection portion 123 detects a time period during which the input frequency domain decomposed signal component Df maintains electric power exceeding the predetermined electric power P2 in the frequency domain, and then defines the detected time period as the reception time period T1. In other words, the period detection portion 123 detects a time period during which there exists a frequency band in which the electric power level of the input frequency domain decomposed signal component Df exceeds the predetermined electric power level P2, and then defines the detected time period as the reception time period T1.

Therefore, it becomes possible to easily detect the reception time period by using the frequency domain decomposed signal component Df.

Next, another example of the reception period detection portion 12 is explained, referring to FIG. 14.

The reception period detection portion 12 in FIG. 14 has an electric power moving average along frequency axis calculation portion 124 and the period detection portion 123. The electric power moving average along frequency axis calculation portion 124 calculates the moving average of the electric power for each frequency band of the input signal. For example, the electric power moving average along frequency axis calculation portion 124 calculates the moving averages of the electric power based on the frequency domain decomposed signal components Df, and outputs the resultant moving averages of the electric power to the period detection portion 123.

The period detection portion 123 detects a time period during which there exists a frequency band in which the moving averages of the electric power exceed a predetermined threshold value of the electric power in the frequency domain, and defines the detected time period as the time reception period T1. Namely, the period detection portion 123 defines as the reception time period T1 the time period in which there is a frequency band in which the moving averages of the electric power exceed a predetermined value of the electric power.

Therefore, the frequency band in which a signal exits is apparently found and the reception time period can be easily detected by the period detection portion 123.

Figure 15:
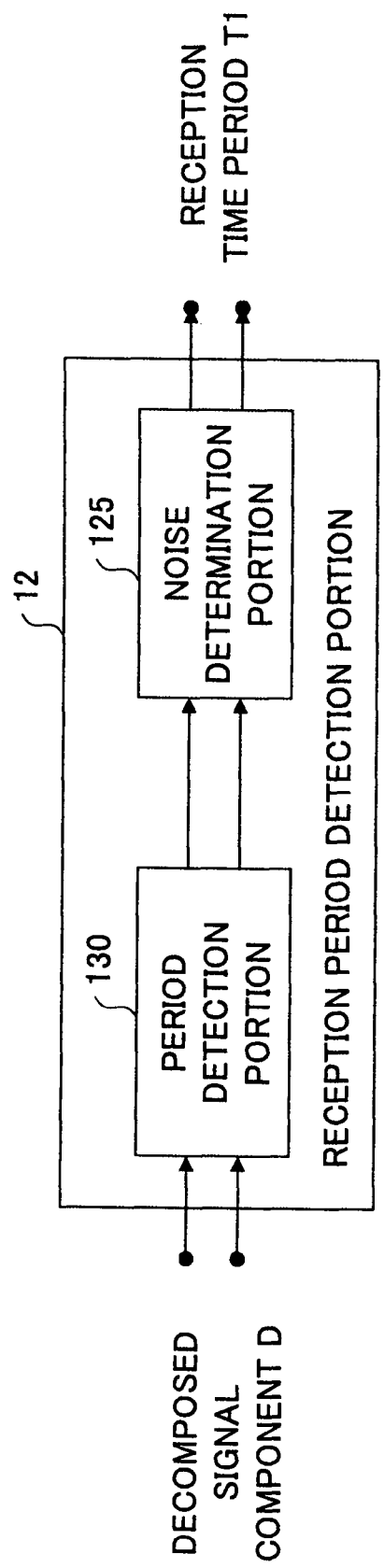
FIG. 15 is a block diagram of a reception time period detecting portion that can determine the presence or absence of noise.

Next, another example of the reception period detection portion 12 is explained, referring to FIG. 15.

The reception period detection portion 12 in FIG. 15 has a period detection portion 130 and a noise determination portion 125. The period detection portion 130 inputs the decomposed signal components obtained by decomposing the received signal so as to perform on the input decomposed signal components the period detection based on the time domain signal components or the period detection based on the frequency domain signal components. The noise determination portion 125 determines whether the decomposed signal components corresponding to the reception time periods detected by the period detection portion 130 are noise.

The noise determination portion 125 subtracts a time period, in which the decomposed signal component is determined to be noise, from the reception time period obtained by the period detection portion 130, and then outputs the resultant time period obtained through the subtraction as the reception time period T1. As a result, even when noise is detected as a decomposed signal component by mistake, this decomposed signal component (noise) is eliminated by excluding the time period in which the decomposed signal component (noise) is detected, thereby more accurately detecting the reception time period T1.

Figure 16:
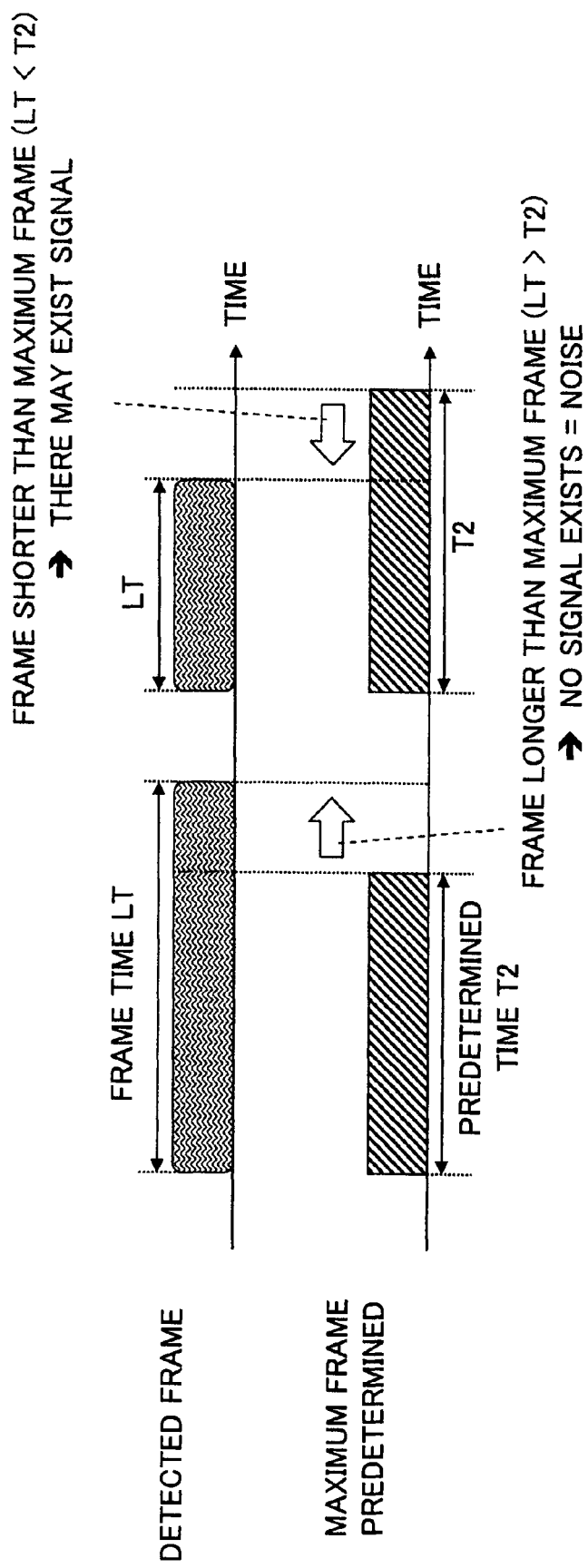
FIG. 16 is a schematic view explaining a method of determining noise using a frame length of the signal components obtained by decomposing the received signal.

Next, a method of determining noise in the noise determination portion 125 is explained, referring to FIG. 16.

The noise determination portion 125 (FIG. 15) calculates a signal frame time LT from the reception time period detected by the period detection portion 130, and determines whether the frame time LT is longer than a predetermined period T2. As the predetermined period T2, the maximum frame time that can be used by the transmitter of a signal component, and a period obtained by adding the maximum delay time caused by electromagnetic wave transmission environment to the maximum frame time can be set.

FIG. 16 shows as an example a situation where the maximum frame time that the transmitter can use is adopted as the predetermined period T2. The electromagnetic wave delay is not considered here, but may be considered in another example. When the frame time LT of the decomposed signal component is longer than the predetermined period T2 (LT>T2), since such a long signal frame does not exist, the decomposed signal component is determined to be noise in the frame time LT. Namely, it is determined that the decomposed signal component corresponding to the detected frame time LT is noise when the frame time LT of the decomposed signal component exceeds the predetermined period T2.

On the other hand, when the frame time LT of the decomposed signal component is shorter than the predetermined period T2 (LT<T2), since such a short signal frame can exist, the decomposed signal is determined to be a signal component in the frame time LT. Namely, it is determined that there exists a signal component corresponding to the detected frame time LT when the frame time LT of the decomposed signal component is shorter than the predetermined period T2.

Figure 17:
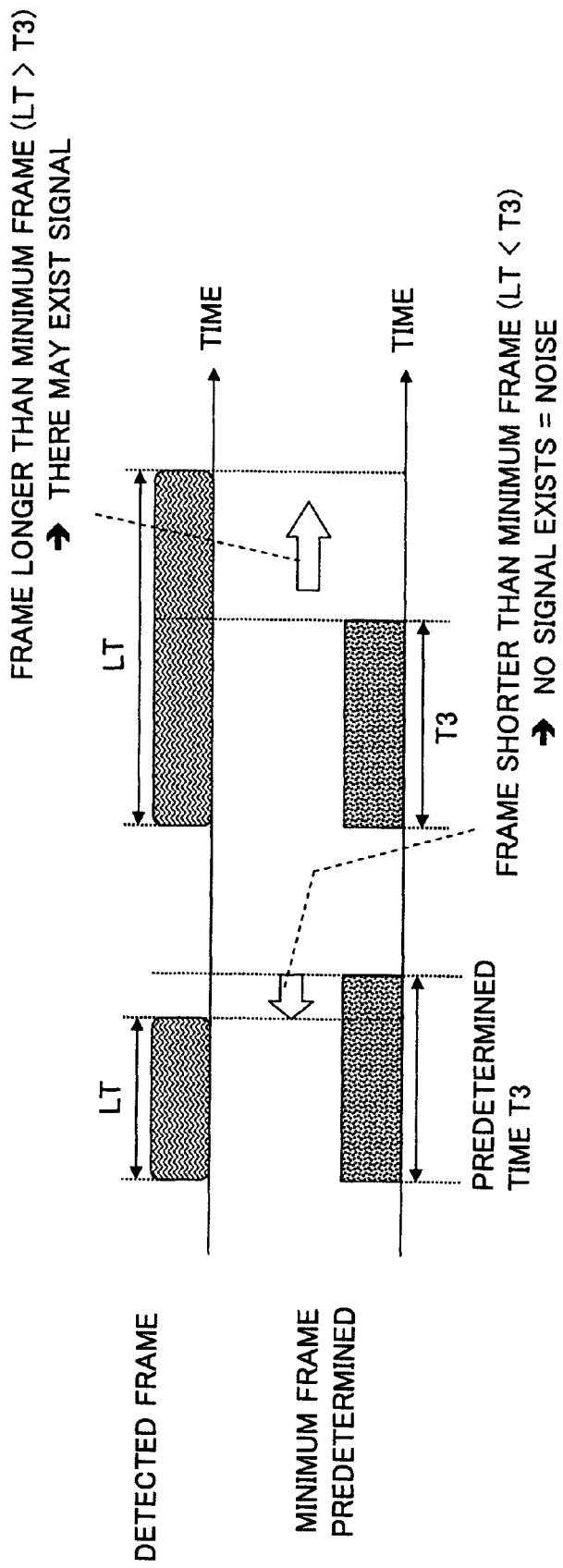
FIG. 17 is another schematic view explaining a method of determining noise using a frame length of the signal components obtained by decomposing the received signal.

Next, another method of determining noise in the noise determination portion 125 is explained, referring to FIG. 17.

The noise determination portion 125 (FIG. 15) calculates the frame time LT from the time period detected by the period detection portion 130, and then determines whether the calculated time frame LT is shorter than a predetermined period T3 or not. As the predetermined period T3, there is a minimum frame time that can be used by the signal transmitter, for example.

When the detected frame time LT is shorter than the predetermined period T3 (LT<T3), since such a frame does not exist, it is determined that the decomposed signal component in the detected frame time LT is noise. Namely, when the detected frame time LT is shorter than the predetermined period T3, it is determined that the decomposed signal component D corresponding to the detected frame is noise. On the other hand, when the detected frame time LT is longer than the predetermined period T3 (LT>T3), since such a frame can exist, it is determined that the decomposed signal component corresponding to the detected frame time LT is a signal component. Namely, when the frame time LT is longer than the predetermined period T3, it is determined that the decomposed signal component D corresponding to the detected frame time is a signal component.

By the way, the above two methods of noise determination carried out in the noise determination portion 125, described with reference to FIG. 16 and FIG. 17, can be used concurrently. In this case, only when the detected frame time is longer than the minimum frame time and shorter than the maximum frame time, it is determined that the decomposed signal component D corresponding to the detected frame time is a signal component.

Figure 18:
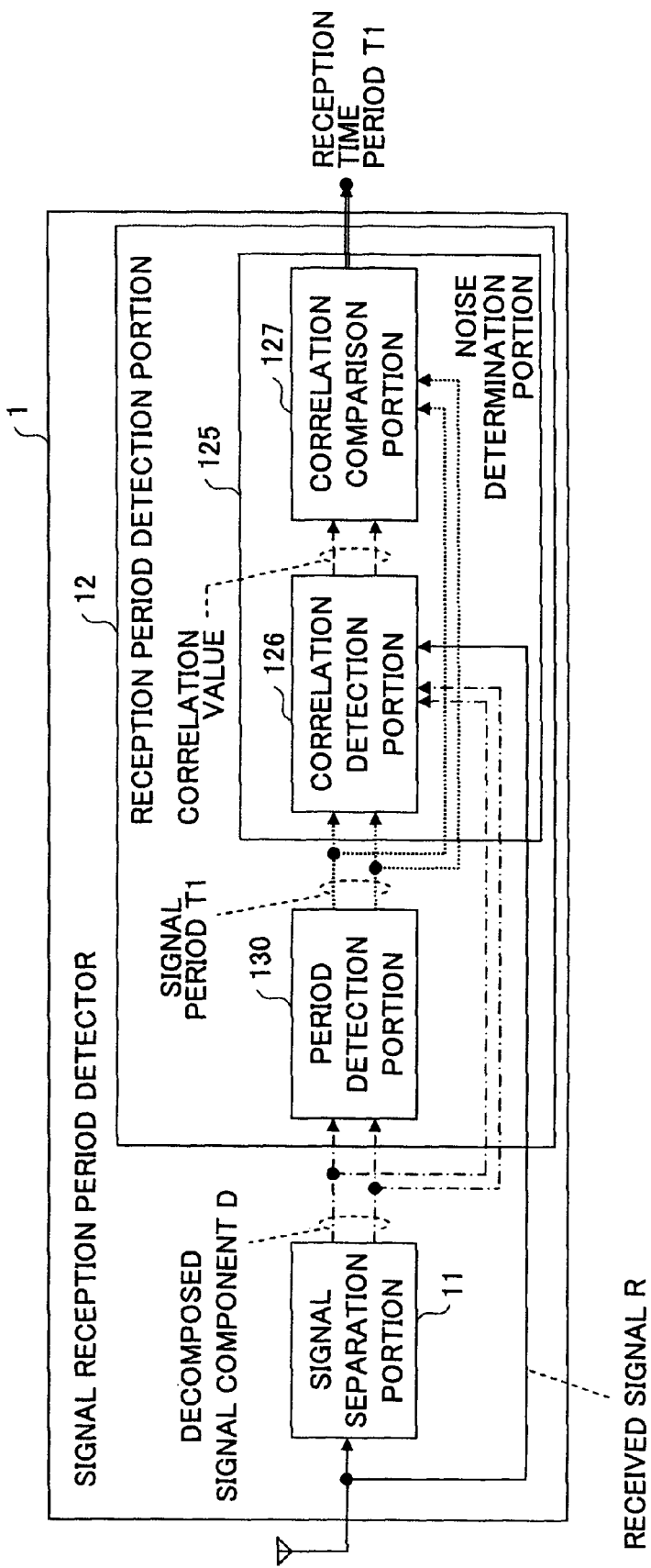
FIG. 18 is a block diagram of a noise determination portion based on correlation detection.

Next, another example of the noise determination portion 125 is explained, referring to FIG. 18.

The noise determination portion 125 in FIG. 18 has a correlation detection portion 126 and a correlation value comparison portion 127. The decomposed signal components D are obtained from the received signal R by the signal separation portion 11. The correlation detection portion 126 performs the correlation detection on the received signal R in the reception time periods T1 obtained by the period detection portion 130 using the decomposed signal components D as reference signals. Namely, the correlation detection portion 126 obtains the correlation between the received signal R and each decomposed signal component D in the reception time period T1 obtained by the period detection portion 130.

When there is a period in which the correlation value obtained by the correlation value comparison portion 127 is lower than or equal to a predetermined value CT1, the decomposed signal component in the period is determined to be noise. Then, the correlation value comparison portion 127 outputs a time period obtained by subtracting the period in which the decomposed signal component is noise from the reception time period obtained by the period detection portion 130, as the (revised) reception time period T1.

Figure 19:
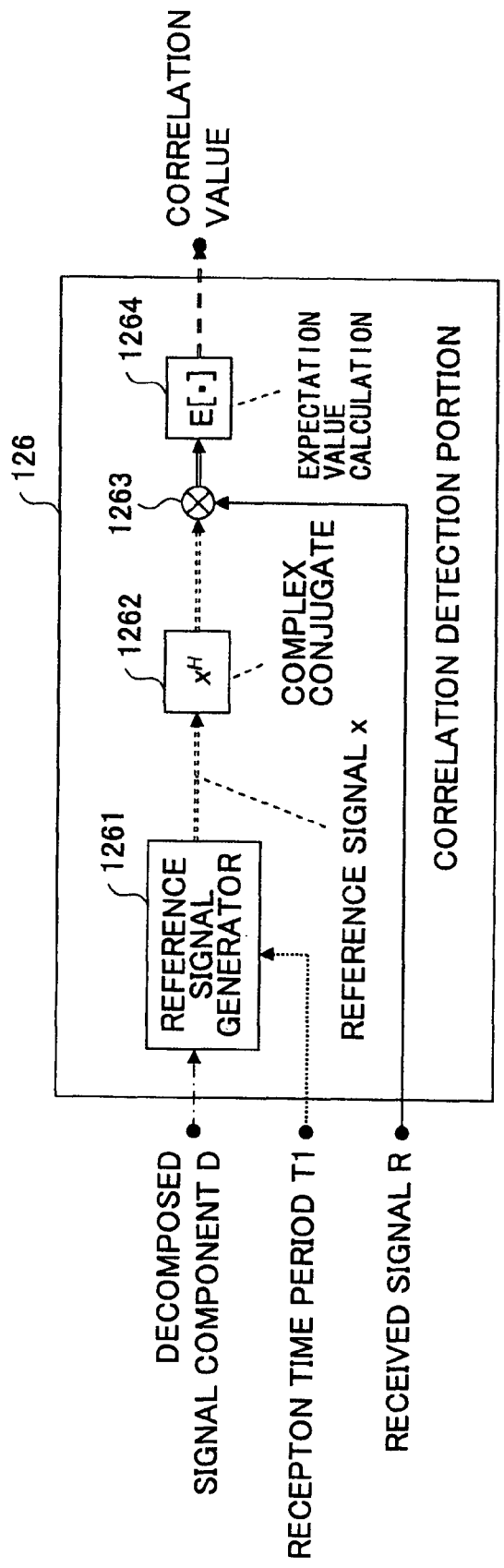
FIG. 19 is a block diagram of a correlation detection portion of the noise determination portion.

Next, an example of the correlation detection portion 126 is explained, referring to FIG. 19.

The correlation detection portion 126 has a reference signal generator 1261, a complex conjugate calculation portion 1262, a multiplication portion 1263, and an expectation value calculation portion 1264. In the correlation detection portion 126, the reference signal generator 1261 extracts only a portion of the decomposed signal components D, the portion corresponding to the reception time period T1. Namely, the reference signal generator 1261 receives the decomposed signal component D from the signal separation portion 11 and the reception time period T1 from the period detection portion 130. Then, the reference signal generation portion 1261 extracts the decomposed signal component corresponding to the reception time period T1 from the decomposed signal component D received from the signal separation portion 11.

Figure 20:
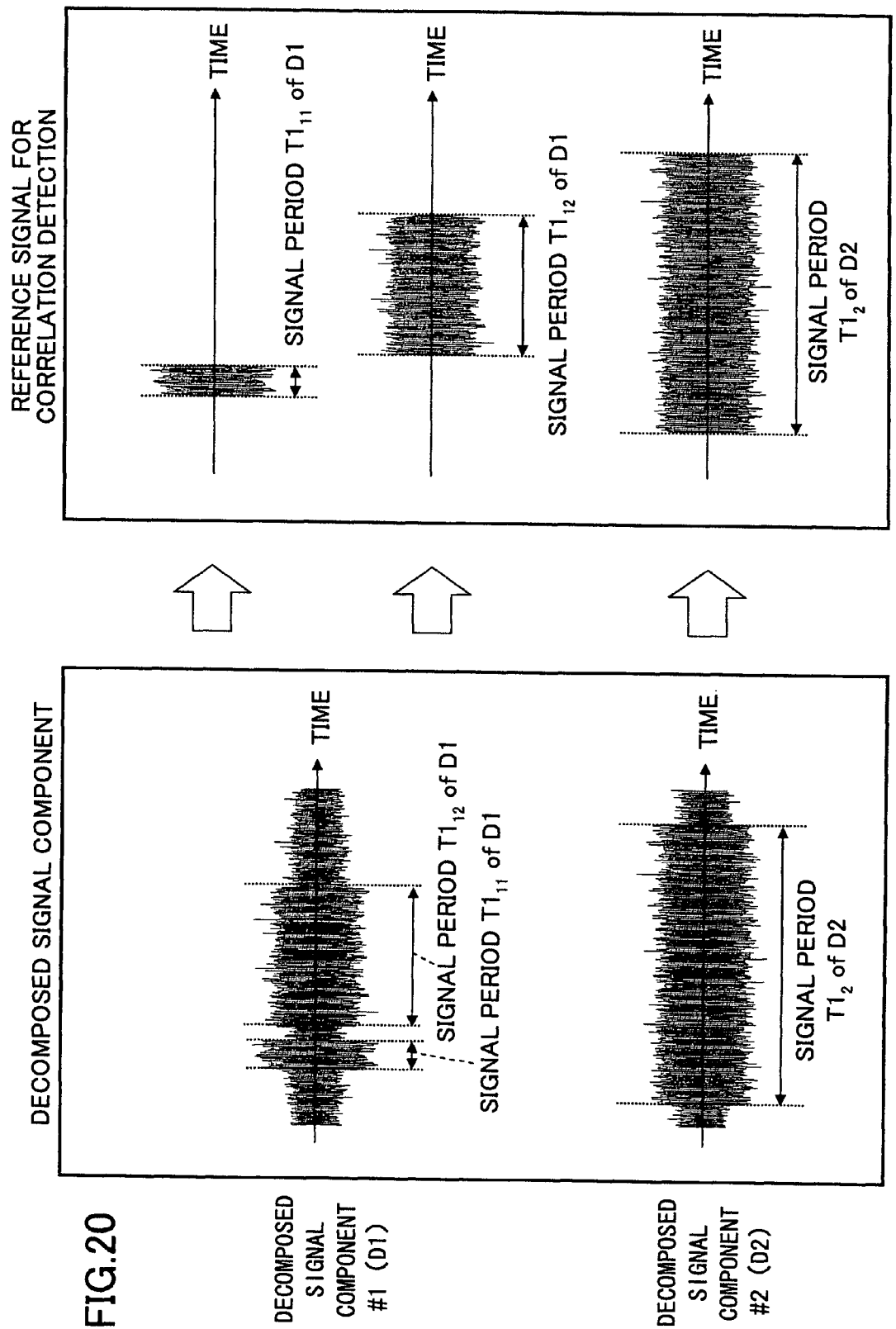
FIG. 20 is a schematic view explaining an example of extracting a reference signal in the correlation detection.

The decomposed signal component D is assumed to be 0 in a part of the reception time period T1 detected as shown in FIG. 20. Referring to FIG. 20, the decomposed signal components #1 (D1) and #2 (D2) are obtained, signal periods $T1_{11}$, $T1_{12}$ are obtained as the signal period (reception time period) T1 of the decomposed signal component #1 (D1), and a time period $T1_2$ is obtained as the signal period T1 of the decomposed signal component #2 (D2). In this case, the reference signal generator 1261 generates, as reference signals x, a signal whose intensity is zero in a period except for the signal period $T1_{11}$ of the decomposed signal component #1 (D1), a signal whose intensity is zero in a period except for the signal period $T1_{12}$ of the decomposed signal component #1 (D1), and a signal whose intensity is zero in a period except for the signal period $T1_2$ of the decomposed signal component #2 (D2).

Next, in the correlation detection portion 126, the complex conjugate calculation portion 1262 obtains a complex conjugate value of the decomposed signal components D, and outputs the complex conjugate value to the multiplication portion 1263. The multiplication portion 1263 multiplies the complex conjugate value and the received signal R, and outputs the resultant value to the expectation value calculation portion 1264. Then, the expectation value calculation portion 1264 calculates the expectation value of the multiplication result. After all the above procedures are completed, the correlation value is obtained.

In the correlation value comparison portion 127 (FIG. 18), when the correlation value obtained by the correlation detection portion 126 is greater than or equal to the predetermined value CT1, it is determined that the reception time period T1 corresponding to the correlation value is the reception time period of the decomposed signal component included in the received signal R. Then, the reception time period T1 is output as the detection result. On the other hand, when the correlation value is less than the predetermined value CT1, it is determined that the decomposed signal component D in the concerned time period T1 is noise and the reception time period T1 is not output as a signal reception time period. As a result, errors in detecting the reception time period of the signal component S included in the received signal R can be significantly reduced.

Figure 21:
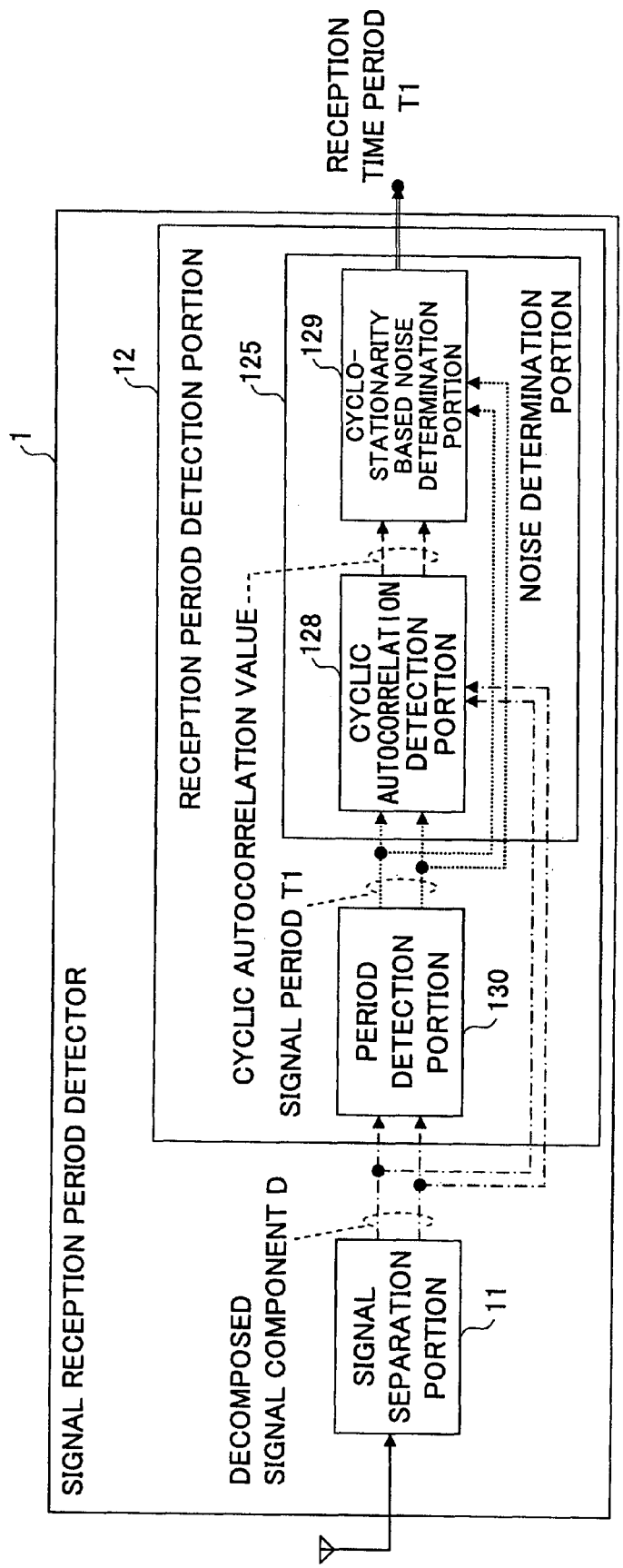
FIG. 21 is a block diagram of a noise determination portion based on cyclic autocorrelation.

Next, another example of the noise determination part 125 is explained, referring to FIG. 21.

The noise determination portion 125 in FIG. 21 has a cyclic autocorrelation detector 128 and a cyclostationarity-based noise determination portion 129.

The cyclic autocorrelation detector 128 calculates a cyclic autocorrelation value of the decomposed signal component D obtained by the signal separation portion 11 in the reception time period T1 obtained by the period detection portion 130. Namely, the cyclic autocorrelation detector 128 receives the decomposed signal component D from the signal separation portion 11 and the signal period (reception time period) T1, and calculates the cyclic autocorrelation value of the decomposed signal component D in the reception time period T1.

The cyclostationarity-based noise determination portion 129 determines whether the decomposed signal component D in the reception time period T1 is noise or not, based on the cyclic autocorrelation value obtained by the cyclic autocorrelation detector 128.

Figure 22:
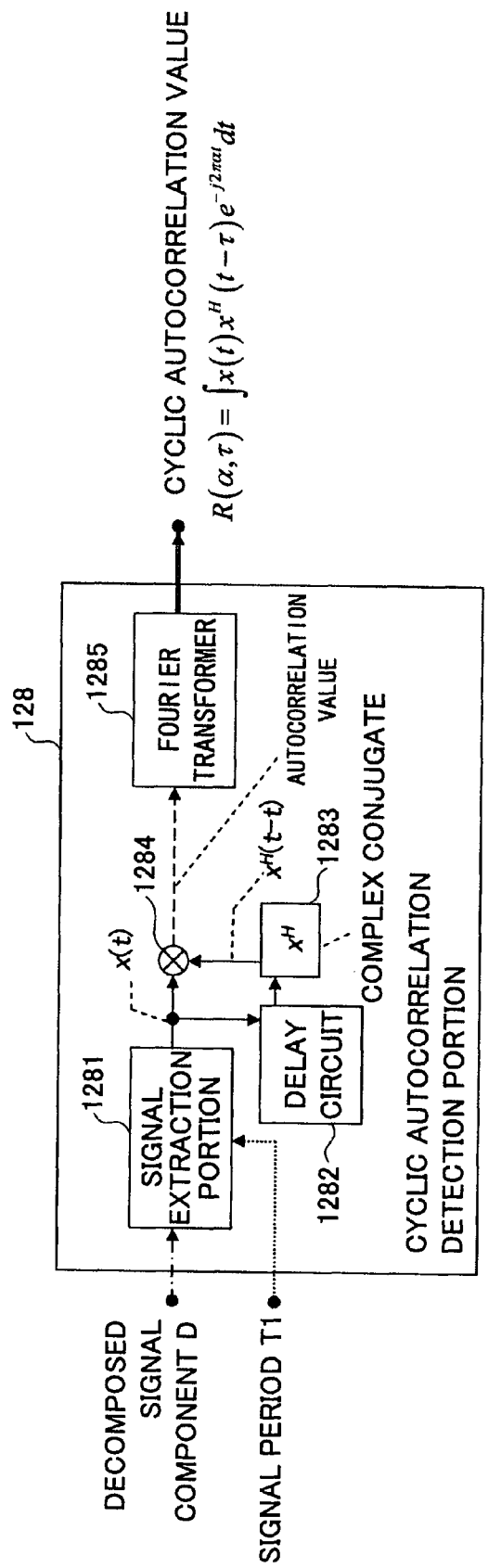
FIG. 22 is a block diagram of a cyclic autocorrelation detection portion in the noise determination portion.

Next, an exemplary configuration of the cyclic autocorrelation detector 128 is explained, referring to FIG. 22.

The cyclic autocorrelation detector 128 has a signal extraction portion 1281, a delay circuit 1282, a complex conjugate calculation portion 1283, a multiplication portion 1284, and a Fourier transformer 1285.

In this cyclic autocorrelation detector 128, the signal extraction portion 1281 receives the decomposed signal component D from the signal separation portion 11 (FIG. 21) and the signal period T1 from the period detection portion 130. Then, the signal extraction portion 1281 extracts from the input decomposed signal component D a portion corresponding to the reception time period T1 detected by the period detection portion 130, in the same manner as explained with reference to FIG. 20. Namely, the signal extraction portion 1281 extracts a part of the decomposed signal component D corresponding to the reception time period T1.

Then, the delay circuit 1282 receives the extracted signal component so as to add a delay to the extracted signal component, and the complex conjugate calculation portion 1283 obtains a complex conjugate value $xH(t-\tau)$ of the extracted signal component with the delay added, in the cyclic autocorrelation detector 128.

The extracted signal (referred to as x(t)) by the signal extraction portion 1281 is also output to the multiplication portion 1284 and multiplied with the output signal from the complex conjugate calculation portion 1283. The multiplication result is output to the Fourier transformer 1285 and converted to a cyclic autocorrelation value $R(\alpha, \tau) = \int x(t) xH(t-\tau) \exp(-j2\pi\alpha t) dt$ by the Fourier transformer 1285.

The cyclic autocorrelation value obtained by the Fourier transformer 1285 is then output to the cyclostationarity-based noise determination portion 129 (FIG. 21), which then determines whether the decomposed signal component D corresponding to the reception time period T1 is a signal or noise. Only when the decomposed signal component D corresponding to the reception time period T1 is determined to be a signal, the cyclostationarity-based noise determination portion 129 outputs the reception time period T1 as the determination result.

Figure 23:
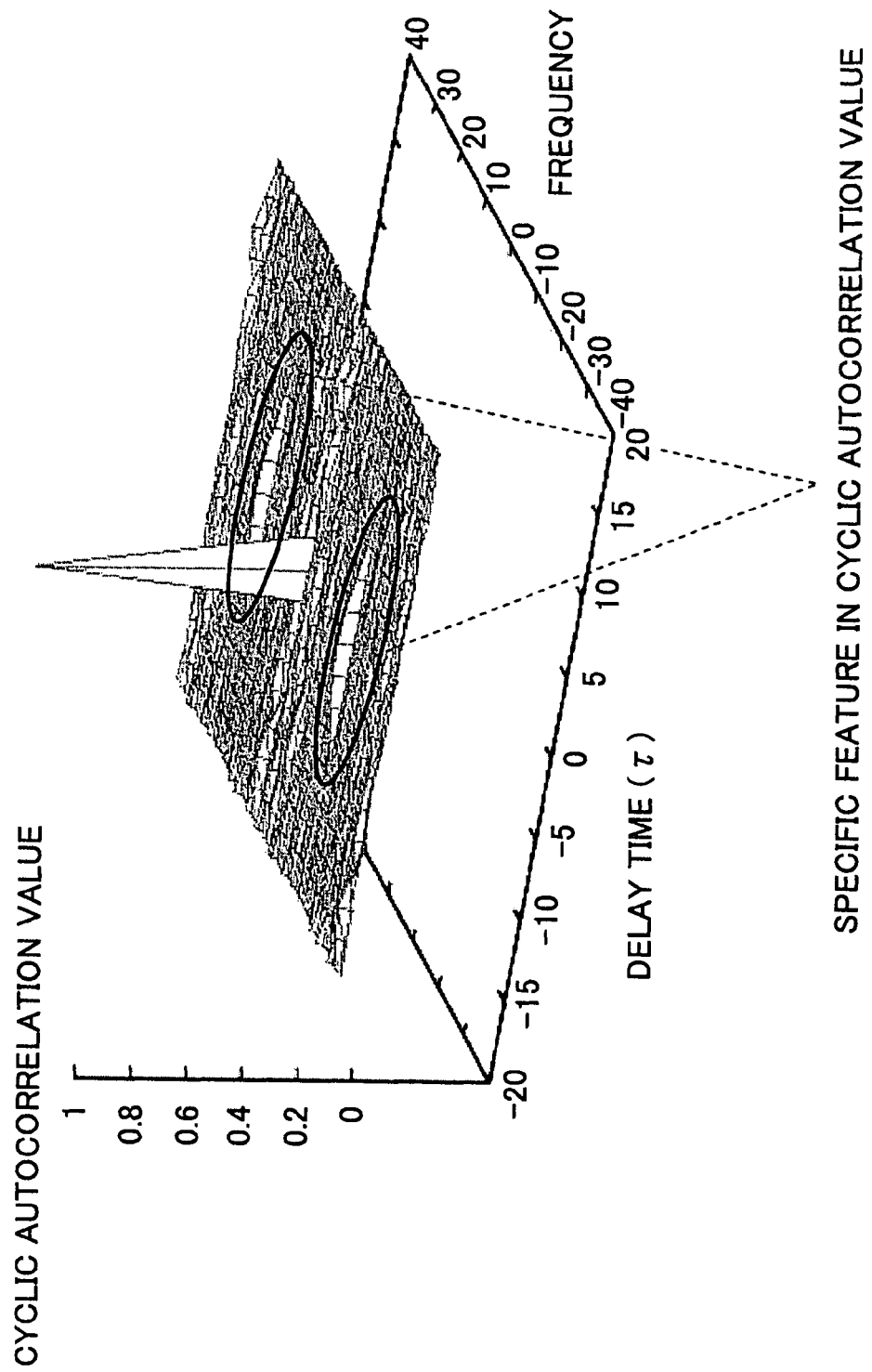
FIG. 23 illustrates examples of characteristics of a cyclic autocorrelation value.

Next, an example of a method of noise determination performed by the cyclostationarity-based noise determination portion 129 is explained, referring to FIG. 23.

Generally, since a signal used in electric communications performs cyclostationarity, a specific feature can be observed in the cyclic autocorrelation value depending on a modulation method, a symbol rate, or the like. Various pattern candidates of the cyclic autocorrelation feature can be prepared in advance based on such a feature taking account of the signal format that can be used, the modulation method, or the like, in the cyclostationarity-based noise determination portion 129. The cyclostationarity-based noise determination portion 129 tries to perform the pattern matching for the cyclic autocorrelation value calculated for the decomposed signal component D using the pattern candidates of the cyclic autocorrelation feature. When the pattern of the cyclic autocorrelation feature for the decomposed signal component D is matched with one of the patterns, the cyclostationarity-based noise determination portion 129 determines that the decomposed signal component D is a signal. When the decomposed signal component D is not matched with any of the patterns, the cyclostationarity-based noise determination portion 129 determines that the decomposed signal component D is noise. By using the autocorrelation value, a signal can be highly accurately distinguished from noise even when the electric power level of the noise is relatively high in the received signal R, thereby reducing errors in detecting the reception time period of the signal component S included in the received signal R.

A Second Embodiment

Figure 24:
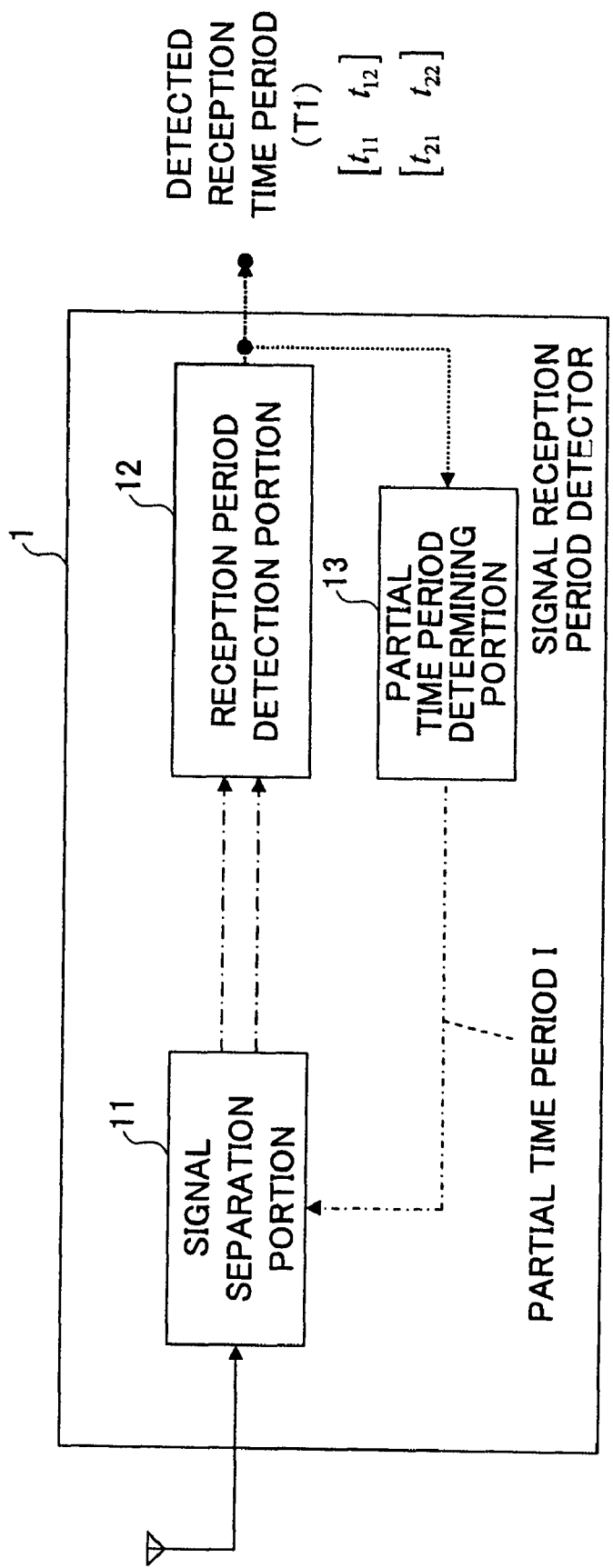
FIG. 24 is a block diagram of the signal reception time period detector with a repeated process capability.

Next, a signal reception time period detector 1 according to a second embodiment of the present invention is explained, referring to FIG. 24.

The signal reception time period detector 1 according to the second embodiment includes a partial time period determining portion 13 in addition to the signal separation portion 11, the reception time period detection portion 12.

The reception time period T1 detected by the reception time period detection portion 12 is input to the partial time period determination portion 13. The partial time period determination portion 13 determines a partial time period I in which the signal separation and the reception time period detection are to be repeated, and outputs the partial time period I to the signal separation portion 11. The signal separation portion 11 receives the partial time period I and performs the signal separation process on the received signal R corresponding to the partial time period I.

Figure 25:
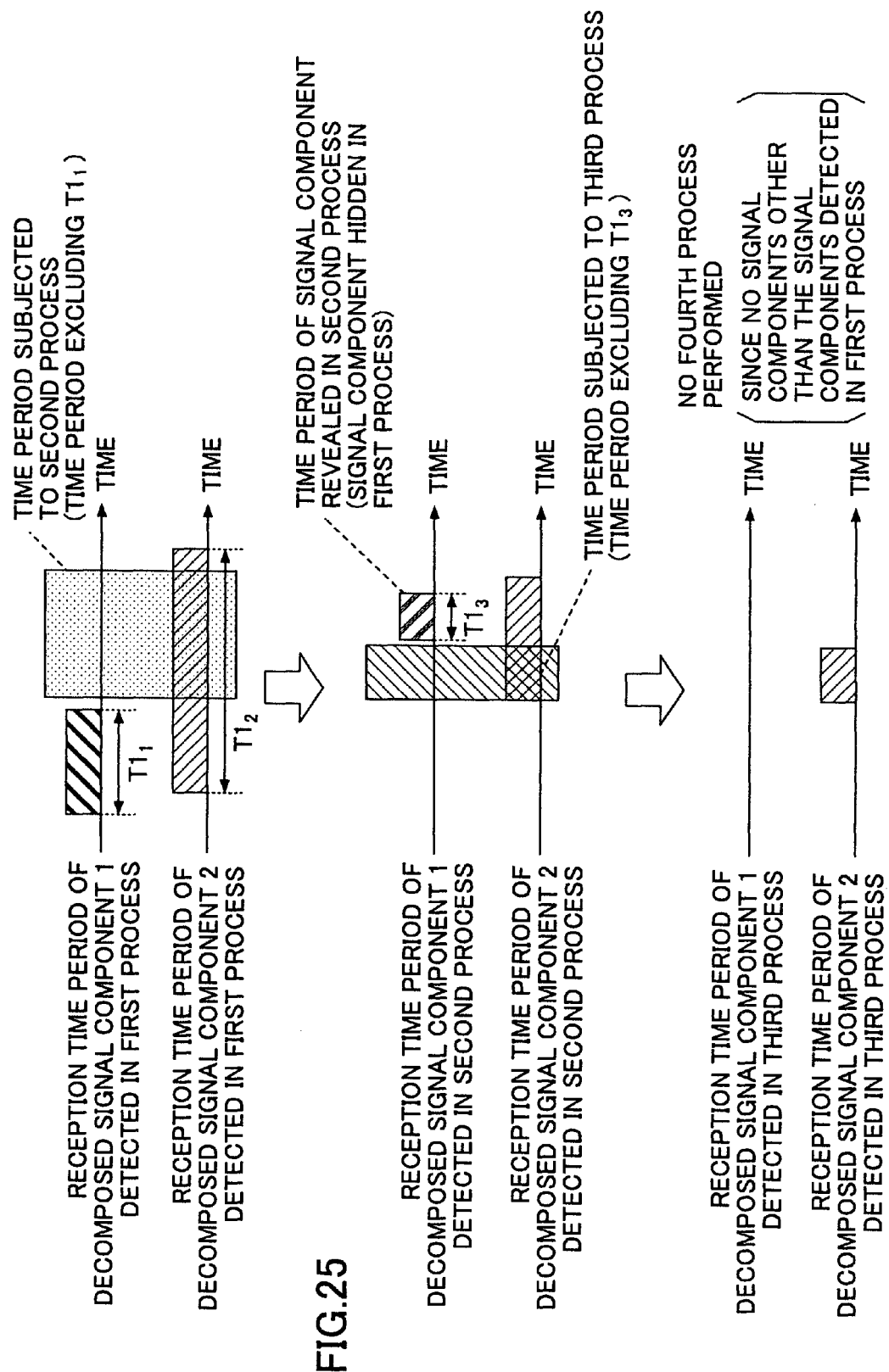
FIG. 25 is a schematic diagram explaining a method of selecting a partial time period that is to be processed.
Figure 26:
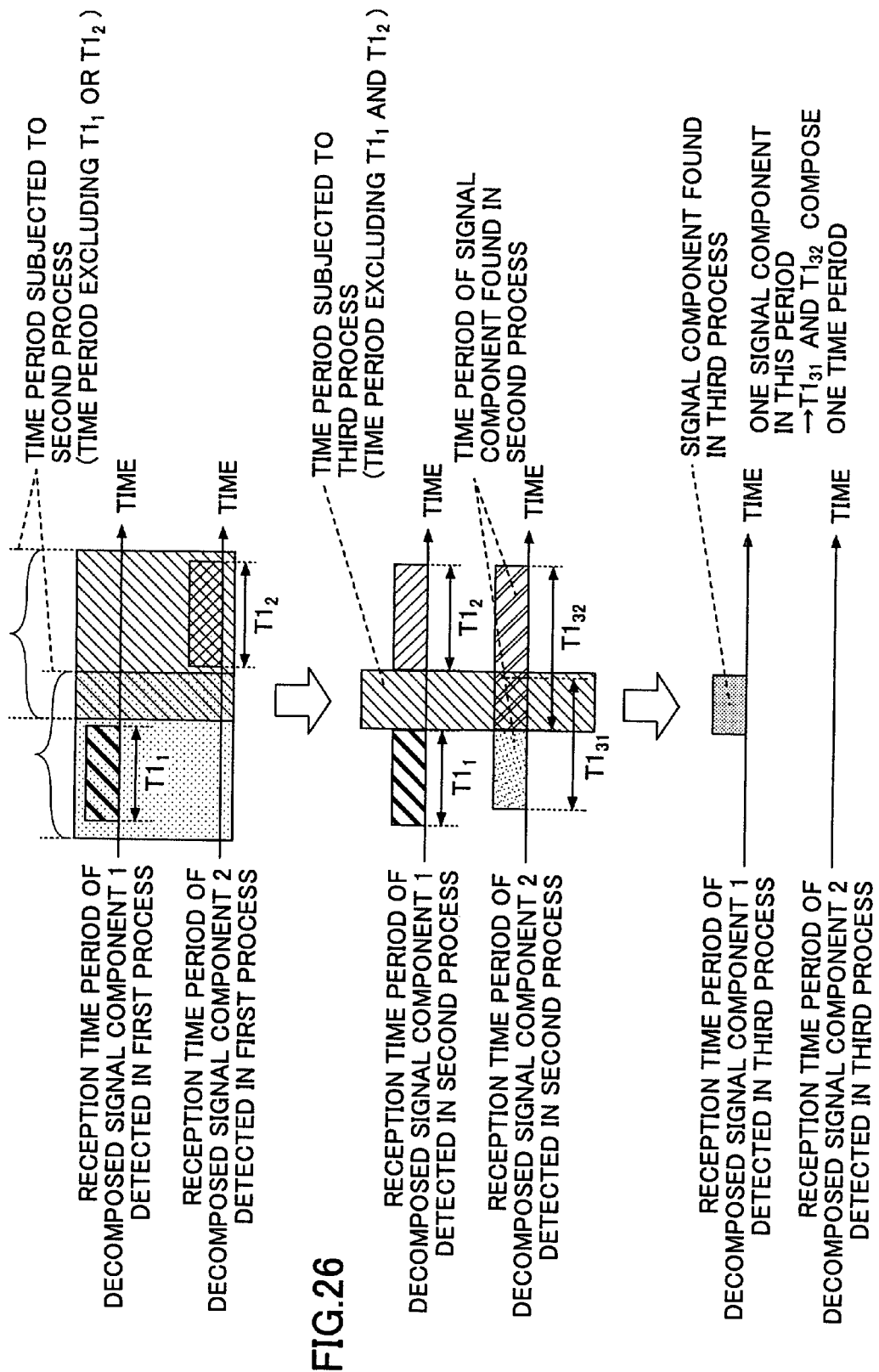
FIG. 26 is another schematic diagram explaining a method of selecting a partial time period that is to be processed.

Specifically, the partial time period determination portion 13 determines the partial time period I as shown in FIGS. 25 and 26.

FIG. 25 shows that reception time periods $T1_1$ and $T1_2$ detected in a first process of the signal separation and the reception time period detection are overlapped.

The signal reception time period detector 1 of the first embodiment may fail to detect a decomposed signal component D during the process of the signal separation and the reception time period detection, if the signal component is buried in other signal components.

In the second embodiment, the partial time period excluding the reception time period $T1_1$ is subjected to reprocessing. As a result, the reception time period of the signal component that has not been detected in the first process can be detected, thereby making it possible to accurately detect the reception time period T1 of the signal component S included in the received signal R.

Such a procedure is described in detail with reference to FIG. 25. In the first process of the signal separation and the reception time period detection, the reception time period $T1_1$ of the signal component 1 and the reception time period $T1_2$ of the signal component 2 are detected. Among the reception time periods $T1_1$ and $T1_2$, a time period excluding the time period $T1_1$ is subjected to a second process.

In the second process that acts on the time period excluding the time period $T1_1$, a reception time period $T1_3$ of the decomposed signal component 1, which has not been found in the first process, and a reception time period of the decomposed signal component 2 are detected. Then, a reception time period excluding the reception time periods $T1_1$ and $T1_3$ is subjected to a third process.

In the third process that acts on the time period excluding the time periods $T1_1$ and $T1_3$, a reception time period of the decomposed signal component 2 is detected. However, no reception time period is found based on the decomposed signal component 1 in the third process, as shown in FIG. 25. In this case, a fourth process is no longer performed. However, if there is a reception time period based on the decomposed signal component 1, the same procedures are repeated. In other words, when there are two or more detected reception time periods, the process of the signal separation and the reception time period detection is repeated in the partial reception time period excluding at least one detected reception time period.

Similarly, FIG. 26 shows that reception time periods $T1_1$ and $T1_2$ detected in the first process are not overlapped. In this case, a signal of a long frame may be hidden in the detected signal component. Under this circumstance, a time period excluding the reception time period $T1_1$ and another time period excluding the reception time period $T1_2$ are subjected to the second process of the signal separation and the reception time period detection. Note that these two time periods subjected to the second process include a time period that does not include both the reception time periods $T1_1$ and $T1_2$. Namely, the second process is performed twice on the time period excluding the reception time periods $T1_1$ and $T1_2$.

When reception time periods $T1_{31}$ and $T1_{32}$ are detected in the second process and each of these reception time periods $T1_{31}$ and $T1_{32}$ includes all of the time period excluding the reception time periods $T1_1$ and $T1_2$, it has to be determined whether the signal components that give the reception time periods $T1_{31}$ and $T1_{32}$ make a single signal component.

Therefore, the third process must be performed on the time period excluding the reception time periods $T1_1$ and $T1_2$.

In the third process, when only one signal component is found in the time period excluding the reception time periods $T1_1$ and $T1_2$, the signal component that gives the reception time period $T1_{31}$ and the signal component that gives the reception time period $T1_{32}$ make a single signal component. Then, the aggregated reception time period from the beginning of the reception time period $T1_{31}$ through the end of the reception time period $T1_{32}$ is determined to be the reception time period T1 which is then output from the signal reception time period detector 1.

On the other hand, when plural decomposed signal components are found in the time period excluding the reception time periods $T1_1$ and $T1_2$, the decomposed signal component that gives the reception time period $T1_{31}$ and the signal component that gives the reception time period $T1_{32}$ are determined to be individual signal components.

Accordingly, even when a long signal component is hidden in other signal components S corresponding to the reception time period T1 detected in the first process of the signal separation and the reception time period detection, the long signal can be detected. Namely, in the first process, the reception time period $T1_1$ is detected from the decomposed signal component 1 found in the first signal separation, and the reception time period $T1_2$ is detected from the decomposed signal component 2 found in the first signal separation. Then, a time period excluding the reception time period $T1_1$ and a time period excluding the reception time period $T1_2$ are subjected to the second process. In the second process, the reception time period $T1_1$ is detected from the decomposed signal component 1 found in the second signal separation, and the reception time periods $T1_{31}$ and $T1_{32}$ are detected from the decomposed signal component 2 found in the second signal separation. Then, the time period excluding the reception time periods $T1_1$ and $T1_2$ is subjected to the third process. In the third process, a reception time period is detected from the decomposed signal component 1 found in the third signal separation, as shown in FIG. 26, which indicates that there is one signal component in the time period from the beginning of $T1_1$ through the end of $T1_2$. Namely, it is determined that the reception time periods $T1_{31}$ and $T1_{32}$ make a single signal component.

A Third Embodiment

Figure 27:
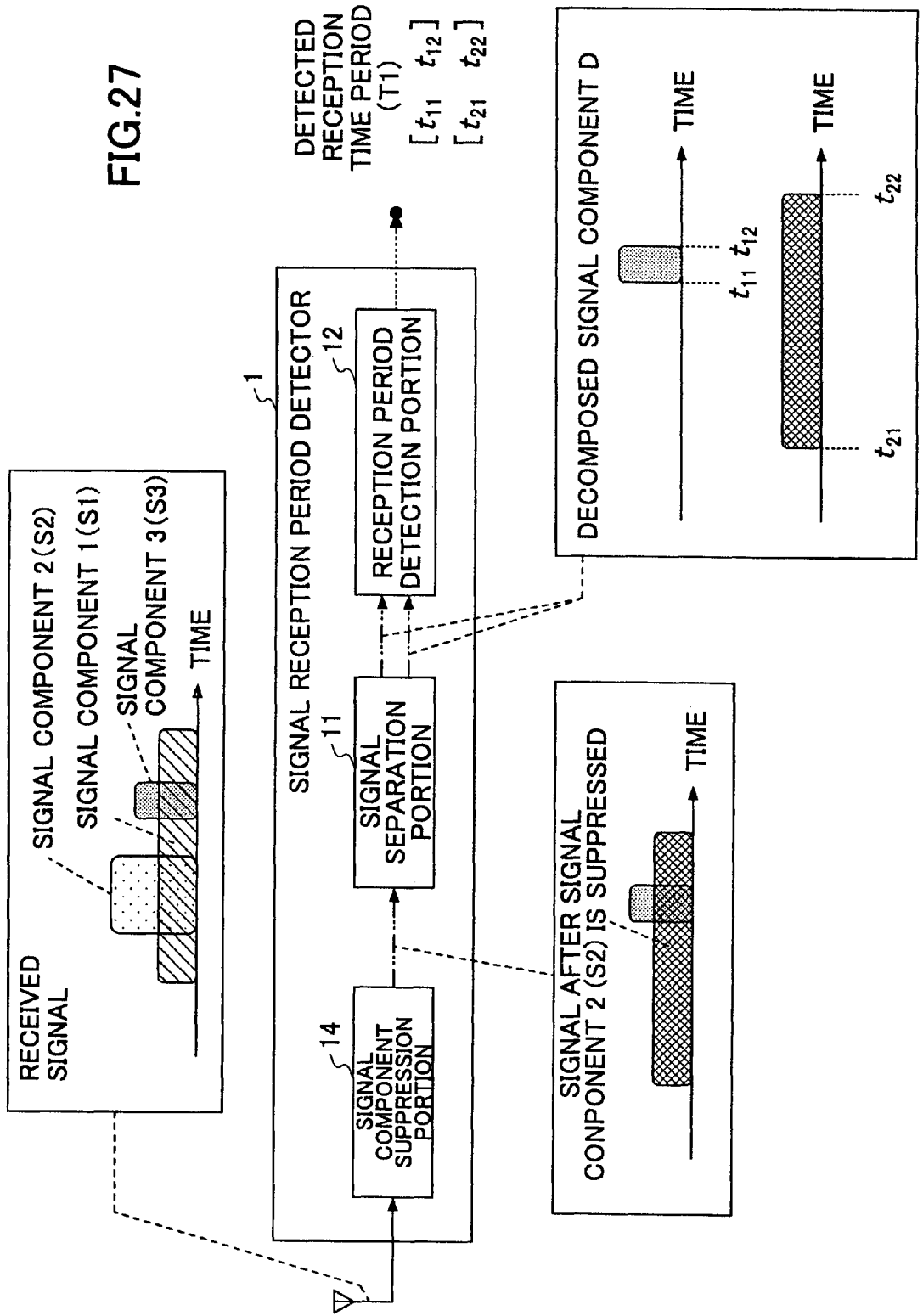
FIG. 27 is a block diagram of a signal reception time period detector that can suppress one or more signal components in advance.

Next, a signal reception time period detector 1 according to a third embodiment of the present invention is explained, referring to FIG. 27.

The signal reception time period detector 1 according to the third embodiment has a signal component suppression portion 14, in addition to the signal separation portion 11 and the reception time period detection portion 12.

This embodiment is preferably employed when information on at least one of the signal components S included in the received signal R is known.

Namely, after the known signal component(s) S is suppressed by, for example, a so-called antenna null steering, the received signal R is processed in the third embodiment.

FIG. 27 shows the signal reception time period detector 1 that has the information regarding a signal component 2 (S2) in advance and tries to detect a reception time period T1 of other signal components (a signal component 1 (S1) and a signal component 3 (S3)). Next is explained how the reception time period T1 of the other signal components (a signal component 1 (S1) and a signal component 3 (S3)) is detected when only the information regarding to the signal component 2 (S2) among the signal components 1 (S1), 2 (S2), and 3 (S3) included in the received signal R is known.

The signal suppression portion 14 acts on the input received signal R and suppresses the signal component 2 (S2) so as to output the resultant received signal to the signal separation portion 11. The signal separation portion 11 acts on the resultant received signal input from the signal suppression portion 14 so as to obtain decomposed signal components D and outputs the decomposed signal components D to the reception time period detector 12. The reception time period detector 12 detects the reception time period T1 from the received decomposed signal components D.

Since at least one of the signal components is suppressed by using the information regarding the at least one of the signal components, interference from the at least one of the signal components can be reduced, thereby making it possible to accurately detect the reception time period.

Figure 28:
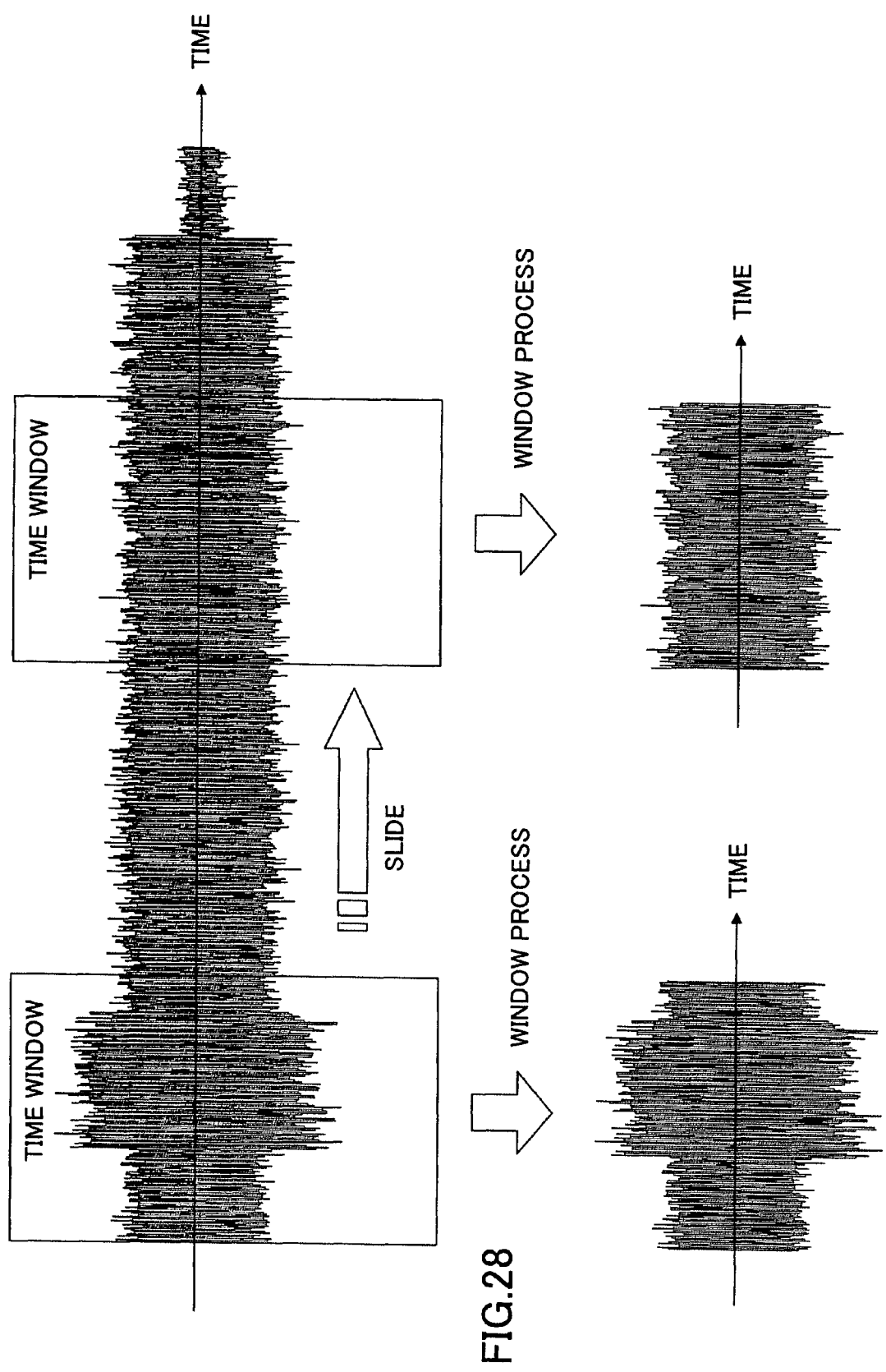
FIG. 28 is a schematic representation of a time window process.

Referring to FIG. 28, still another example of the signal separation portion 11 is explained.

In the signal reception time period detector 1 in FIG. 28, the signal separation portion 11 may separate signal components from the received signal R using a time window, as shown in FIG. 28.

The signal separation portion 11 extracts a portion of the received signal R using the time window having a predetermined time width, and separates signal components included in the extracted portion of the received signal R. The extracted portion has the same time width as the time width of the time window. Then, the signal separation portion 11 slides the time window sequentially to cover all the time period of the received signal R. Namely, the signal separation portion 11 separates signal components throughout the time period.

By using the time window, the signal separation portion 11 can separate signal components more accurately, which contributes to an accurate detection of the reception time period. In addition, a signal size used in the signal separation can be reduced, which can in turn reduce the amount of calculation.

Figure 29:
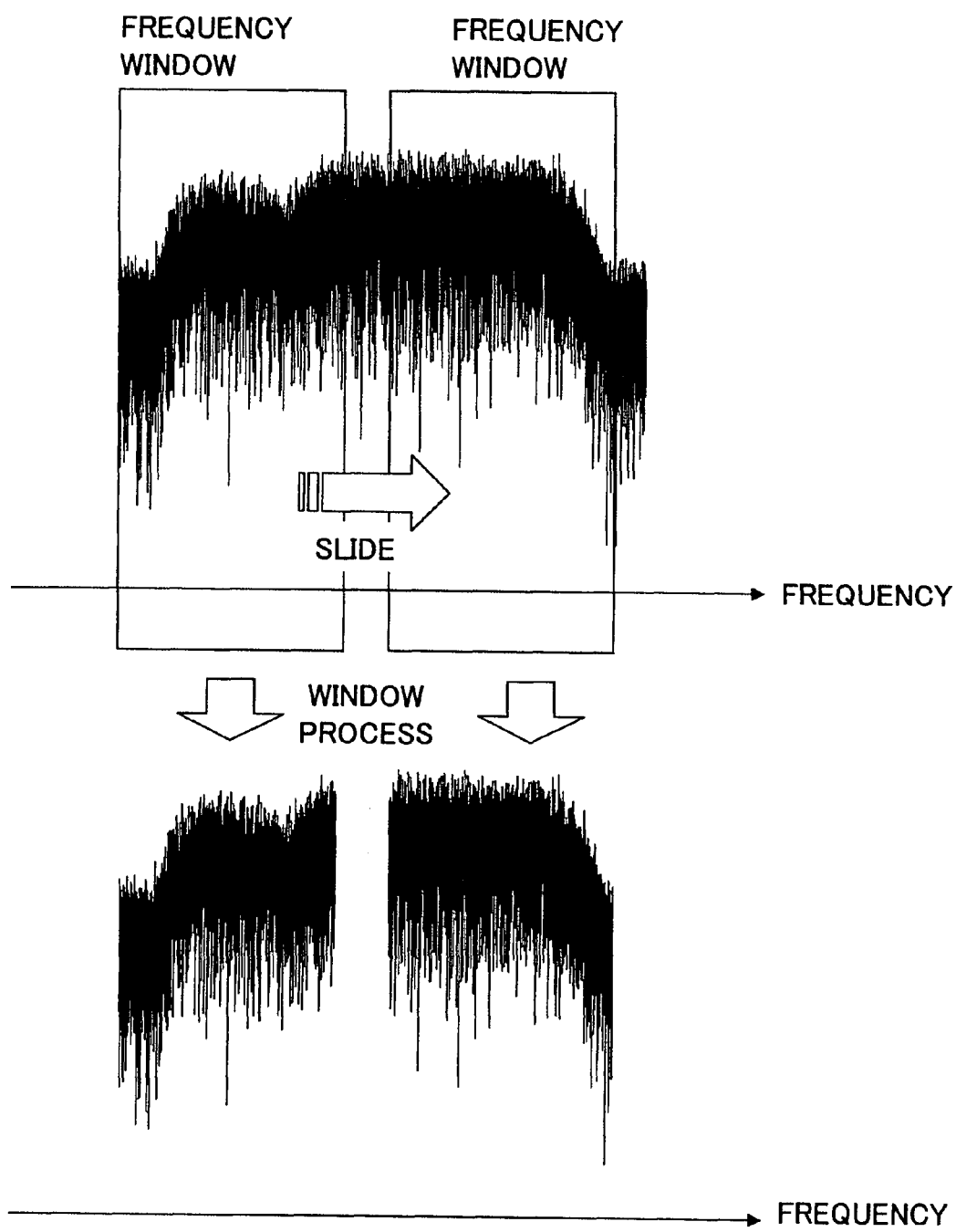
FIG. 29 is a schematic representation of a frequency window process.

Moreover, the signal separation portion 11 may extract a portion of the received signal R using a frequency window (FIG. 29) having a predetermined frequency width, and separate signal components included in the extracted portion of the received signal R. The extracted portion has the same frequency width as the frequency width of the frequency window. The signal separation portion 11 slides the frequency window sequentially to cover all the frequency period of the received signal R. Namely, the signal separation portion 11 separates signal components throughout the frequency period.

Referring to FIG. 30, an example of the signal separation using the frequency window is further explained.

First, the received signal R (x(t)) is multiplied with exp(−j2π∆ft) as a rotator so as to shift the center frequency of a signal. Then, the signal after the center frequency is shifted is limited to a predetermined width using a band limiting filter. Therefore, the signal having the width whose center coincides with the shifted center frequency can be successfully extracted. Namely, by limiting the received signal R subjected to the signal separation to a predetermined narrower width, the signal components can be accurately separated from the received signal R. In addition, Fourier transformation for the entire frequency range is not required, thereby reducing the amount of calculation.

According to the third embodiment of the present invention, the reception time period of the signal component included in the received signal can be detected without using signal parameters.

By the way, since the training symbols is suitable for certain types of signals, from the view point of an accurate detection of the reception time period, the correlation detection method using the signal components of the interference signal that is less influential may be chosen.

The signal reception time period detector according to the present invention is applicable to a wireless receiver.

The present application contains subject matter related to Japanese Patent Application No. 2006-150463, filed on May 30, 2006, the entire content of which is incorporated herein by reference.

What is claimed is:

1. A signal reception time period detector comprising:
a signal separation portion configured to decompose into signal components a received signal composed of a plurality of signals which are overlapped at least partially in a period during which the received signal is transmitted; and
a reception time period detection portion configured to detect a time period during which the signal components are received based on the signal components,
wherein the signal separation portion outputs a plurality of time domain signal components, and
wherein the reception time period detection portion observes a fluctuation of an electric power level or an amplitude of each of the time domain signal components to detect a signal reception start time and a signal reception end time by detecting a point of time when the electric power or amplitude increases abruptly and a point of time when the electric power or the amplitude decreases abruptly, respectively, with a fluctuation over a predetermined value.

2. The signal reception time period detector of claim 1, wherein the signal separation portion decomposes the received signal into the signal components in accordance with signal independency.

3. The signal reception time period detector of claim 1, wherein the signal separation portion receives a plurality of the received signals output from a plurality of antennas and performs Gaussian elimination on a first signal component whose channel state is known among signal components included in the received signals so as to detect other signal components that are subject to interference by the first signal component.

4. The signal reception time period detector of claim 1, wherein the signal separation portion decomposes the received signal into signal components in a time domain.

5. The signal reception time period detector of claim 4, wherein the signal separation portion extracts a portion of the received signal using a time window having a predetermined width and decomposes the extracted received signal into time domain signal components.

6. The signal reception time period detector of claim 1, wherein the signal separation portion comprises a Fourier transformation portion configured to convert the received signal in a time domain into a frequency domain signal, wherein the frequency domain signal is decomposed into frequency domain signal components.

7. The signal reception time period detector of claim 6, wherein the signal separation portion further comprises an inverse Fourier transformation portion that converts the frequency domain signal components into time domain signal components.

8. The signal reception time period detector of claim 6, wherein the signal separation portion extracts a portion of the received signal using a frequency window having a predetermined width and decomposes the extracted received signal into frequency domain signal components.

9. The signal reception time period detector of claim 1, wherein the reception time period detection portion performs correlation detection on signal components obtained by decomposing the received signal in a time domain using a symbol sequence known by a transmitter and a receiver, thereby detecting the time period of the signal components.

10. The signal reception time period detector of claim 9, wherein the reception time period detection portion comprises a noise determination portion that determines whether the signal component in the corresponding time period is noise, wherein unless the signal component is determined to be noise the corresponding time period is output as a reception time period.

11. The signal reception time period detector of claim 10, wherein the noise determination portion determines that a signal component is noise when a time period corresponding to the signal component exceeds a first predetermined value.

12. The signal reception time period detector of claim 10, wherein the noise determination portion determines that a signal component is noise when a time period corresponding to the signal component is shorter than a second predetermined value.

13. The signal reception time period detector of claim 10, wherein the noise determination portion comprises a correlation detection portion configured to perform correlation detection on the received signal and the signal components obtained by decomposing the received signal in each time period corresponding to the signal components; and a correlation value comparison portion configured to determines that a signal component is noise when the correlation value obtained for the signal component by the correlation detection portion is smaller than a third predetermined value.

14. The signal reception time detector of claim 10, wherein the noise determination portion comprises a cyclic autocorrelation detection portion configured to calculate a cyclic autocorrelation value for the signal components obtained by decomposing the received signal in each time period corresponding to the signal components; and a cyclostationarity-based noise determination portion configured to determine whether a signal component in the detected time period is a signal in accordance with the cyclic autocorrelation value detected for the signal component by the cyclic autocorrelation detection portion and determine that the signal component is noise unless the signal component is determined to be a signal.

15. The signal reception time period detector of claim 1, wherein the reception time period detection portion comprises a period detection portion configured to observe a fluctuation of an electric power level of each signal component obtained by decomposing the received signal in a time domain and detect the time period of the each of the signal components based on whether the observed fluctuation is equal to or greater than a predetermined value.

16. The signal reception time period detector of claim 15, wherein the reception time period detection portion further comprises a first calculation portion that calculates along a time axis a moving average of electric power of each signal component obtained by decomposing the received signal, wherein the period detection portion detects the time period using the moving average of the electric power.

17. The signal reception time period detector of claim 1, wherein the reception time period detection portion comprises a period detection portion configured to use the signal components obtained by decomposing the received signal in a frequency domain and detect the time period based on presence or absence of a frequency band having an electric power level greater than a predetermined value.

18. The signal reception time period detector of claim 1, wherein the reception time period detection portion further comprises a second calculation portion that calculates along a frequency axis a moving average of electric power of each signal component obtained by decomposing the received signal in a frequency domain, wherein the reception time period detection portion detects the time period using the moving average of the electric power.

19. The signal reception time period detector of claim 1, wherein the signal separation portion repeats the signal decomposition of a portion of the received signal, the portion corresponding to a part of the time period that has been detected.

20. The signal reception time period detector of claim 19, wherein the part of the time period is a time range excluding at least one of reception time periods corresponding to the detected signal components.

21. The signal reception time period detector of claim 1, further comprising a signal suppression portion configured to suppress one or more signal components among the signal components included in the received signal to output a suppressed received signal, wherein the signal separation portion decomposes the suppressed received signal into signal components.

* * * * *